US008095491B1

(12) United States Patent
Dillon

(10) Patent No.: US 8,095,491 B1
(45) Date of Patent: Jan. 10, 2012

(54) OPTIMIZATION TECHNIQUE USING HEAP SORT

(75) Inventor: Brian S. Dillon, Warsaw, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 645 days.

(21) Appl. No.: 12/316,559

(22) Filed: Dec. 8, 2008

(51) Int. Cl.
*G06N 5/02* (2006.01)
(52) U.S. Cl. ........................................................ 706/46
(58) Field of Classification Search .................. None
See application file for complete search history.

(56) References Cited

U.S. PATENT DOCUMENTS

| 5,426,722 | A | * | 6/1995 | Batchelder | 700/245 |
| 6,115,360 | A | * | 9/2000 | Quay et al. | 370/235 |
| 6,360,217 | B1 | * | 3/2002 | Gopal et al. | 1/1 |
| 2007/0088699 | A1 | * | 4/2007 | Edmondson | 707/7 |

OTHER PUBLICATIONS

G. C. Hunt et al., "An efficient algorithm for concurrent priority queue heaps", *Information Processing Letters*, 1996. 60, 151-7.
A. Frank, "On Kuhn's Hungarian Method—A tribute from Hungary", *Egervary Research Group*, Oct. 2004, TR-2004-14, http://www.cs.elte.hu/egres-04-14.pdf.
M. J. Golin, "Bipartite Matching & the Hungarian Algorithm", Aug. 30, 2006, Hong Kong University of Science and Technology, Dept. Of Computer Science & Engineering, http://www.cse.ust.hk/~golin/COMP572/Notes/Matching.pdf.
R. A. Pilgrim, "Munkres' Assignment Algorithm", Murray State University, Kentucky, http://csclab.murraystate.edu/bob.pilgrim/445/munkres.html.
H. P. Halpern, "The Hungarian Algorithm", University of Cincinnati, McMicken College of Arts and Sciences, http://math.uc.edu/~halpern/Linear.progr.folder/Handouts.1p.02/Hungarian.algorithm.pdf.

* cited by examiner

*Primary Examiner* — Jeffrey A Gaffin
*Assistant Examiner* — Paulinho E Smith
(74) *Attorney, Agent, or Firm* — Gerhard W. Thielman, Esq.

(57) ABSTRACT

A method and a corresponding computer-readable medium are provided for optimizing a decision assignment based on a sought benefit. The optimization operations include mapping agents to actors into pairs, designating a benefit to each pair for a set of nodes, arranging the nodes into heaps (with each heap corresponding to an agent), selecting the node with the sought benefit as the head of the heap for all the heaps, and summing each benefit of the heads to establish a cumulative benefit. The benefit designation further includes associating the node with the benefit, action and agent that correspond to that pair, and disposing the node into the heap that corresponds to the agent. Arranging the heap further includes comparing first and second nodes to determine which has the sought benefit within the heap, and ordering the peak node as the head of the heap. Further operations include deconflicting first and second heaps that have heads with equal benefit, and truncating tail nodes from the head of each heap.

16 Claims, 23 Drawing Sheets

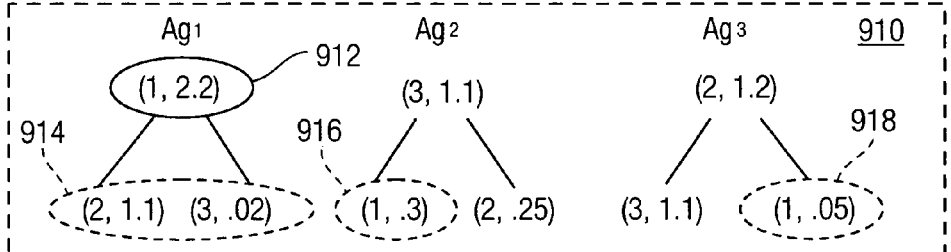
Fig. 8A   Fig. 8B
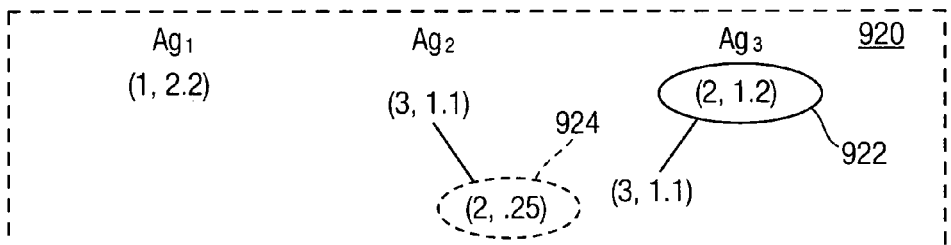
Fig. 9A
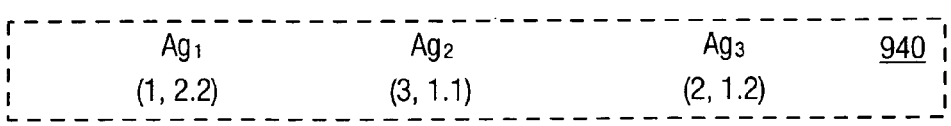
Fig. 9B
Fig. 9C
Fig. 9D

Fig. 27

Scenarios 2900

| | $t_1$ | $t_2$ | $P_{k1}$ | $P_{k2}$ | $P(1)$ | $P(2)$ |
|---|---|---|---|---|---|---|
| 1. | $b_{11}b_{12}$ | | $1-(.6)(.6)=.64$ | 0 | $(.64)(1)+(.36)(0)=.64$ | $(0)(0)=0$ |
| 2. | | $b_{21}b_{22}$ | 0 | $1-(.8)(.95)=.24$ | $(.76)(0)+(.24)(1)=.24$ | $(0)(0)=0$ |
| 3. | $b_{11}$ | $b_{22}$ | .4 | .05 | $(.4)(.95)+(.6)(.05)=.41$ | $(.4)(.05)=.02$ |
| 4. | $b_{12}$ | $b_{21}$ | .4 | .2 | $(.4)(.8)+(.6)(.2)=.44$ | $(.4)(.2)=.08$ |

Expected Value Kills

1. $1(.64)+2(0) = 0.64$
2. $1(.24)+2(0) = 0.24$
3. $1(.41)+2(.02)= 0.45$
4. $1(.44)+2(.08)= 0.60$

Probabilistic solution 2920

$\longrightarrow \quad w_1 \rightarrow t_1 \quad w_2 \rightarrow t_1$ 93.8% of Optimal

Heap solution

$\longrightarrow \quad w_1 \rightarrow t_2 \quad w_2 \rightarrow t_1$

2930

| | $w_1$ | $w_2$ |
|---|---|---|
| $t_1$ | .4 | .4 |
| $t_2$ | .2 | .05 |

Fig. 29

OPTIMIZATION TECHNIQUE USING HEAP SORT

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to optimization. In particular, this invention provides an expedient technique for maximizing decision benefits for multiple agents and actions by heap sorting.

Many fields involving multiple interacting parameters assign a first series of agents to a second series of actions. This is known to have no perfect solution that can be calculated in real-time for very large data sets. A simple example can be described for two planes and two flight plans. Given the specific speeds and distance of each flight, one objective might include assigning the planes to the flights so that the planes arrive at most nearly the same time. In such a simplistic example, there are only four potential solutions for inspection to determine the optimal.

For practical applications, the potential solutions may lie far beyond the acceptable bounds of real-time computation. For this reason, optimization algorithms are necessary to determine which set of assignments correspond to the best indicators of a beneficial outcome. This type of problem is a subset of integer programming.

SUMMARY

Conventional optimization techniques yield disadvantages addressed by various exemplary embodiments of the present invention. In particular, the deterministic method to optimize assignments of agent-to-action necessitates more computation time than practical operations allow. Various exemplary embodiments provide expeditious operation techniques using heap sorting.

In various exemplary embodiments, a naïve (or brute force) version of the deterministic method is used for comparison with the heap sorting method. This conventional method, called Probabilistic, always computes the correct solution, but suffers from the classic problem of excessive computation time. This deterministic method has origins in the military domain for selecting the set of decisions that offers the sought benefit value. An example benefit for a weapon agent against a target action would be best probability of kill.

Various exemplary embodiments provide a method and a corresponding computer-readable medium for optimizing a decision assignment based on a benefit. The optimization operations include mapping agents to actors into pairs, designating a benefit to each pair, creating a node for each pair and associated benefit, arranging the nodes into heaps, selecting a head node among the head nodes that has a sought benefit as an assignment, repeating the selection operation iteratively until each heap has a corresponding assignment, and summing the selected heads to establish a cumulative benefit.

In various exemplary embodiments, the benefit designation further includes associating the node with the benefit, action and agent that correspond to that pair, and inserting the node into the heap that corresponds to the agent. Arranging the heap further includes comparing first and second nodes to determine which has the sought benefit within the heap, and ordering the peak node as the head of the heap. Further operations include deconflicting first and second heaps that have heads with equal benefit, and truncating tail nodes from the head of each heap.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIG. 8A is a tabular view of Agent and Action final assignment values;

FIG. 8B is a tabular view correlating Agent and Action with benefit values;

FIGS. 9A-9D are node-value views of heap operations;

FIG. 27 is a set of tabular views of a heap algorithm example;

FIG. 29 is a tabular view of a first distinction example; and

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Various exemplary embodiments described herein illustrate advantages of heap sorting as compared to deterministic solutions for optimizing decision assignments based on calculated benefit.

Figure 1:
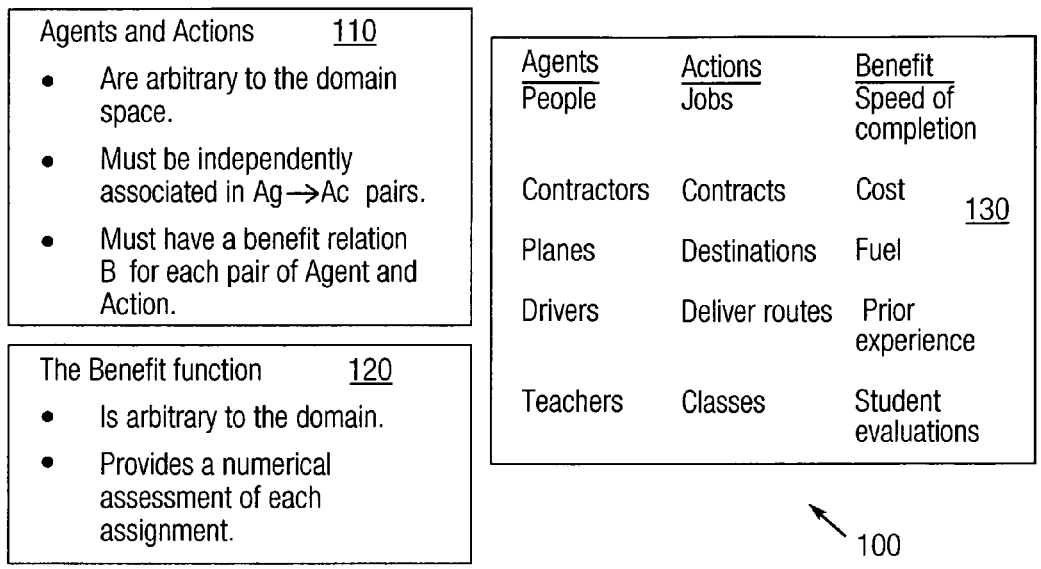
FIGS. 1 and 2 are tabular diagrams of definitions and examples.

FIG. 1 shows sets 100 of tables with definitions and/or examples. Definitions of Agents (Ag) and Actions (Ac) 110 relate to mapping of pairs, such as in a matrix array. For military applications, an example agent would be a weapon w, and a corresponding action would be a target t. Definition of the Benefit Function (B) 120 relates to a numerical assessment of each assignment between an agent and an action. A tabular list 130 associates practical examples of the abstract terms agent, action and benefit. For military applications, kill probability would constitute a quantifiable benefit.

Figure 2:
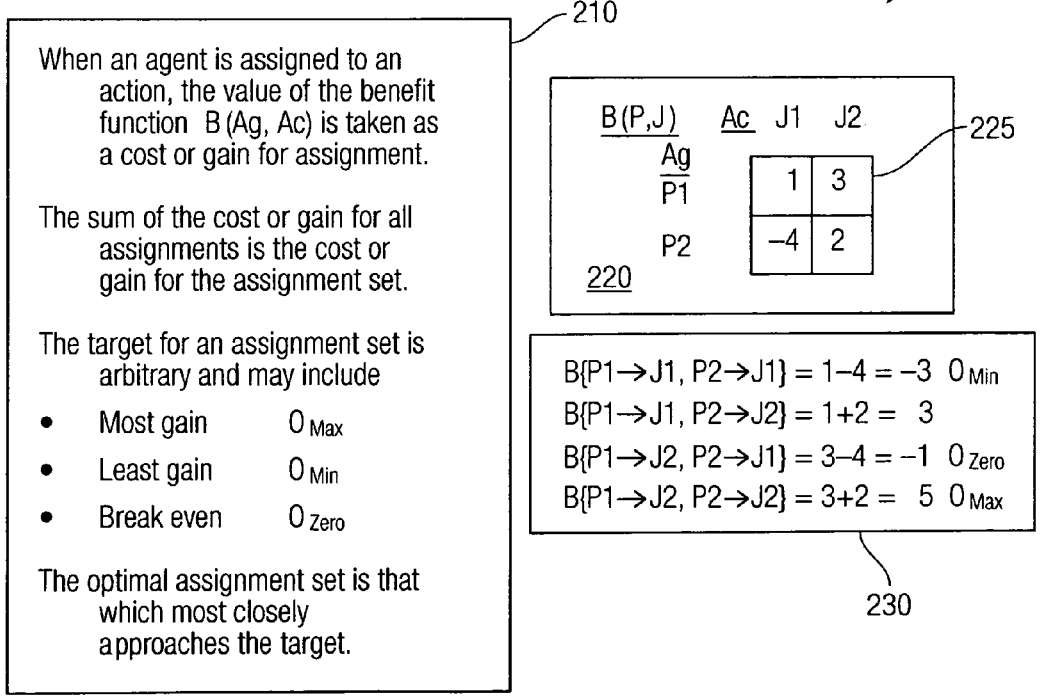

FIG. 2 shows sets 200 of tables with rank ordering to determine optimal selection of agent→action assignments. The benefit (B) can be evaluated as shown in the gain table 210. Each benefit produces a gain or cost ranging from positive to negative values. The sum of the benefits from any set of agent→action assignments constitutes the benefit for the whole set, with optimal assignment sets most closely matching an objective goal. An example benefit table 220 shows a correlation array 225 between rows of agents (P1 and P2) as compared against columns of actions (J1 and J2), with benefit for each associated entry (agent P versus action J).

A tabular comparison 230 shows a series of set benefit calculations. The first set benefit derives from the assignment of the first agent P1 to the first action J1 and the assignment of the second agent P2 to the first action P1, which corresponds to minimal gain $O_{min}$ for any assignment set possible from array 225. The third set benefit derives from the assignment of the first agent P1 to the second action J2 and the assignment of the second agent P2 to the first action J1, which corresponds to break-even gain $O_{zero}$. By contrast, the last set benefit derives from the assignment of the first agent P1 to the second action J2 and the assignment of the second agent P2 to the second action J2, which corresponds to maximum gain $O_{max}$. A sought benefit can be maximum, minimum or break-even gain, or relate to alternate quantifiably comparable objective.

While the exemplary embodiments related herein are examples of a search for the maximum gain $O_{max}$, those skilled in the art will have no trouble adapting the method to search for either of the other optimal solutions as well as optimal objectives based on other constraints. The process of adapting the method includes altering the heap order relationship and making comparisons during each iterative step.

Deterministic methods can be used to obtain the optimal solution. Unfortunately, deterministic methods have a very high order of complexity driven by the number of agents and actions. This renders these conventional methods as impractical for real-time calculations that involve large numbers of agents and actions. Various exemplary embodiments describe advantages of heap sorting as compared to deterministic solutions for optimizing decision assignments based on calculated benefit.

There exist heuristic algorithms which use a best-guess method and attempt to derive the optimal answer. Genetic variation algorithms are representative of the set of heuristic solutions. Genetic algorithms vary assignments as "genes" and attempt to produce an optimal generation. However, such algorithms require many iterations. Moreover, although these can judge overall fitness of the solution calculated, these cannot determine the degree of accuracy of the final solution.

One commonly used deterministic algorithm is called branch-and-bound in which each possible agent→action assignment takes place in a descending tree of possibilities (i.e., examining a first agent at the base of the tree with a branch existing for all possible assignments, examining a second agent at the next level, and so forth). This also calculates every single solution and thus provides no advantage over the brute force method unless bound by some constraint to disqualify some as yet incomplete branches. This bound enables a multitude of potential solutions to be ignored as less advantageous or inconsistent with the constraint. This leads to more rapid calculations and a completely accurate solution, but in practical applications fewer constraints or more options quickly expand the calculation time beyond control. Alternatively, the use of a heuristic algorithm may be faster, but at worst, the calculation can require an indefinite calculation time. Although the calculation time might be arbitrarily controlled, for very simple examples, the degree of accuracy of a heuristic solution cannot be known. Neither branch-and-bound nor a genetic variation algorithm presents desirable characteristics for high order problems in which accuracy ranks high in priority.

Decision assignment problems based on calculated benefit begin by calculating the benefit from all assignments. An array of agents and actions can be selected with assigned benefit values for each array element. This may involve each agent selecting an action or no action. The assignments and benefits can be represented as a probability table to identify probable benefit value of each assignment. The deterministic algorithm needs to examine each possible permutation of assignments, the storage and calculation requirements of which can rapidly grow exponentially. By contrast, for the heap algorithm, these steps include having each agent select each action to form a heap limited in size to the number of agents.

The heap algorithm orders the heaps according to a sought benefit as the desired optimum. For the condition in which the desired optimum is $O_{max}$, the heaps are ordered with their heads as the highest benefit values. Then in the first iteration, the heap algorithm selects the highest probability of benefit from the heads of heaps after removing conflicts with the same benefit and action by determining, the next greatest benefit from the superior combination. The heap algorithm removes the selected agent from the next iteration and removes the selected action from the remaining heaps. These assignments can be stored with the corresponding benefit, yielding on average 92% of the optimal solution (from the probabilistic analysis). One major advantage of the heap algorithm provides calculation times and storage requirements several orders of magnitude less than for the deterministic algorithm.

The general methodology for heap sort can be described in context of a ship defense example. Asset defense (e.g., a combat ship) as an objective can be performed by w agents (e.g., weapons). This asset can be threatened by t possible actions (e.g., targets). The benefit for defense can be characterized by a known set of $p_k$ values (e.g., kill probabilities) for each agent-to-action (e.g., weapon-to-target) assignment. Each w agent can be limited to a single t action, although there may be more targets than weapons. The optimal solution of w→t can be selected to maximize the probable benefit (e.g., number of kills) as for a total operation.

Figure 3A:
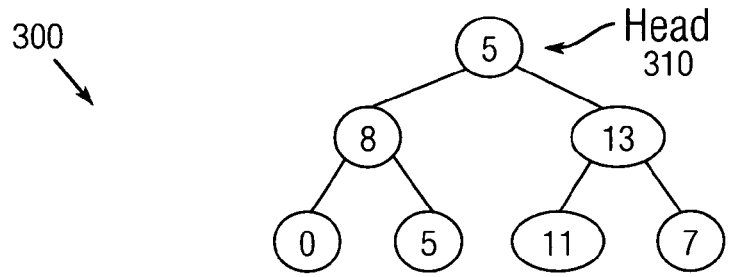
FIGS. 3A-3C are binary tree views of example heap operations.

Optimization techniques, as provided in various exemplary embodiments, employ heap sorting to reduce the number of calculations. A heap represents a collection of objects organized into a tree of nodes. FIG. 3A shows an exemplary binary tree with a head 310 denoted at the top. The size of the heap constitutes the number of nodes in the tree. The height of a heap corresponds to the number of node levels. For example, the heap 300 includes seven nodes in three levels. Each node that connects to a lower node constitutes a parent of that lower node. Each node connecting to a higher node is a child of that higher node. The head 310 of the heap 300 represents a node having no parent.

Figure 3B:
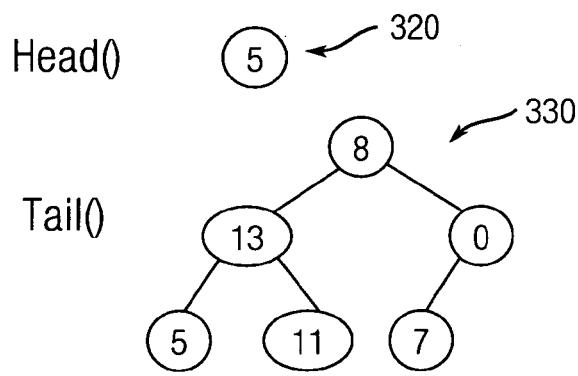
Figure 3C:
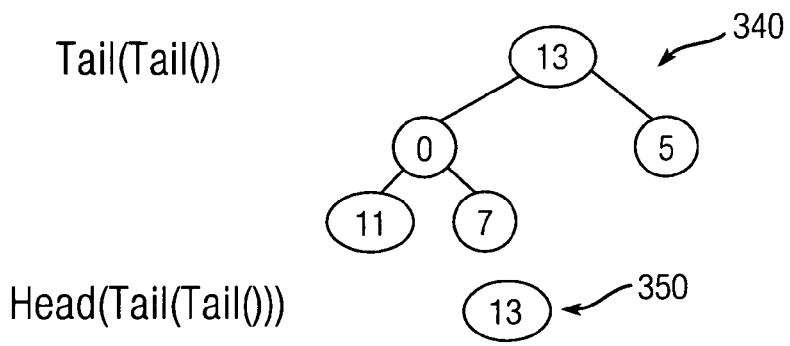

A heap operation represents an instruction regarding the heap order. FIGS. 3B and 3C provide examples of such operations. The operation 320 Head( ) presents the object or node at the head 310 of the heap 300. The operation 330 Tail( ) provides the remainder of the restructured heap. These operations may be nested. The operation 340 Tail(Tail( ) removes the head, rearranges the nodes so that a child node becomes head of the remainder and then repeats the action on the new heap. The operation 350 Head(Tail(Tail( ))) isolates that head of the Tail(Tail( ))).

Figure 4A:
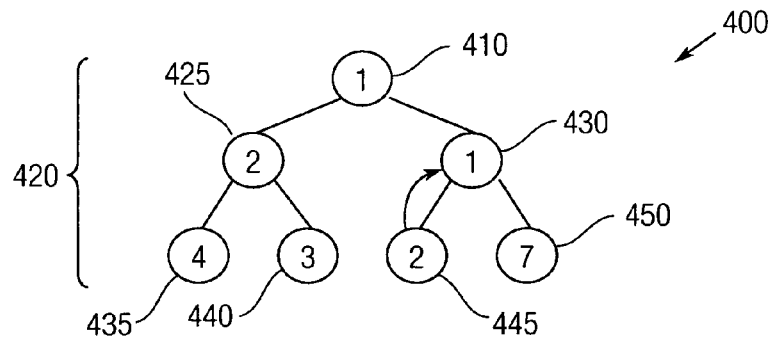
FIGS. 4A-4D are binary tree views of further heap operations.

FIG. 4A illustrates a heap 400 denoting parent-child relationships. The heap 400 includes a head 410 coupled to a tail 420. Two tail nodes 425 and 430 connect directly to the head 410. Two tail nodes 435 and 440 connect to the first tail node 425. Another two tail nodes 445 and 450 connect to the second tail node 430. A heap is ordered if a relationship exists between each parent and child pair that remains valid for all pairs.

Figure 4B:
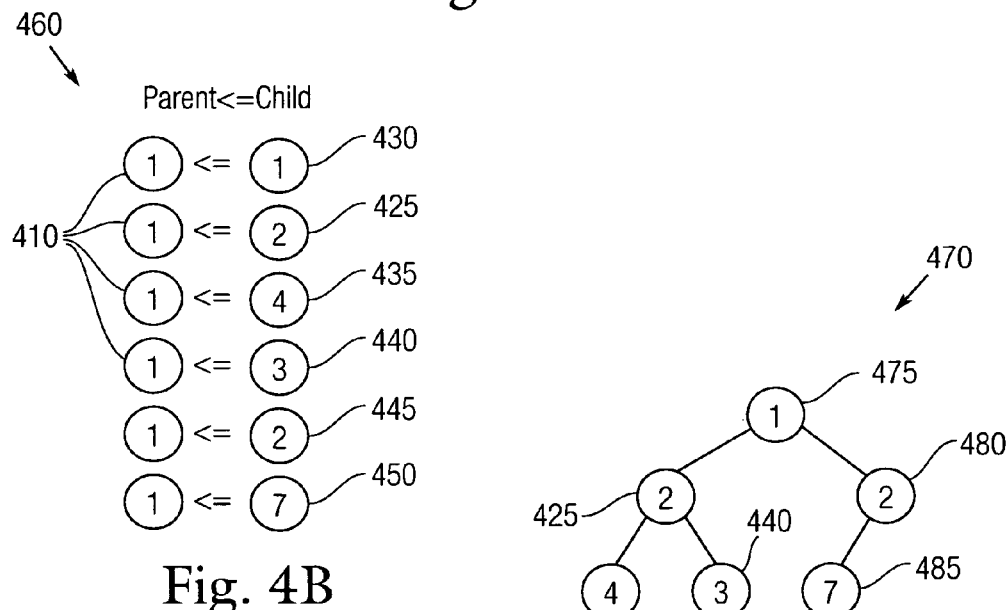
Figure 4C:
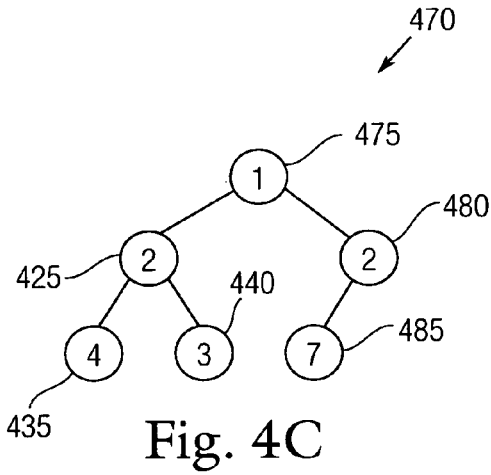
Figure 4D:
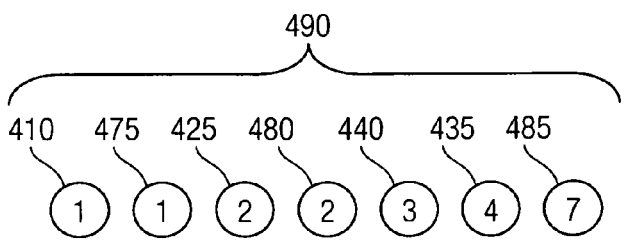

Such an order insures that the Head( ) of an ordered heap returns the node that satisfies the relationship for all other nodes. FIG. 4B shows that the head 410, on the left, satisfies such a relationship 460 with each of the child nodes of the tail 420. Additionally, such an order insures that the Tail( ) can be reordered to maintain that relationship. FIG. 4C shows the Tail( ) of the heap 400 so that the second tail node 430 has become the new head 475 and its child node 480 previously in position for the tail node 445 in the third level (directionally shown by a curved arrow in the heap 400). Another third level node 485, previously corresponding to the third level, connects to the repositioned second level node 475. Such an order also insures that successive Head( ) of Tail( ) operations constitutes and ordered list. FIG. 4D provides such an ordered list 490 sequenced nodes 410, 430, 425, 475, 440, 435 and 480 by value.

Figure 5:
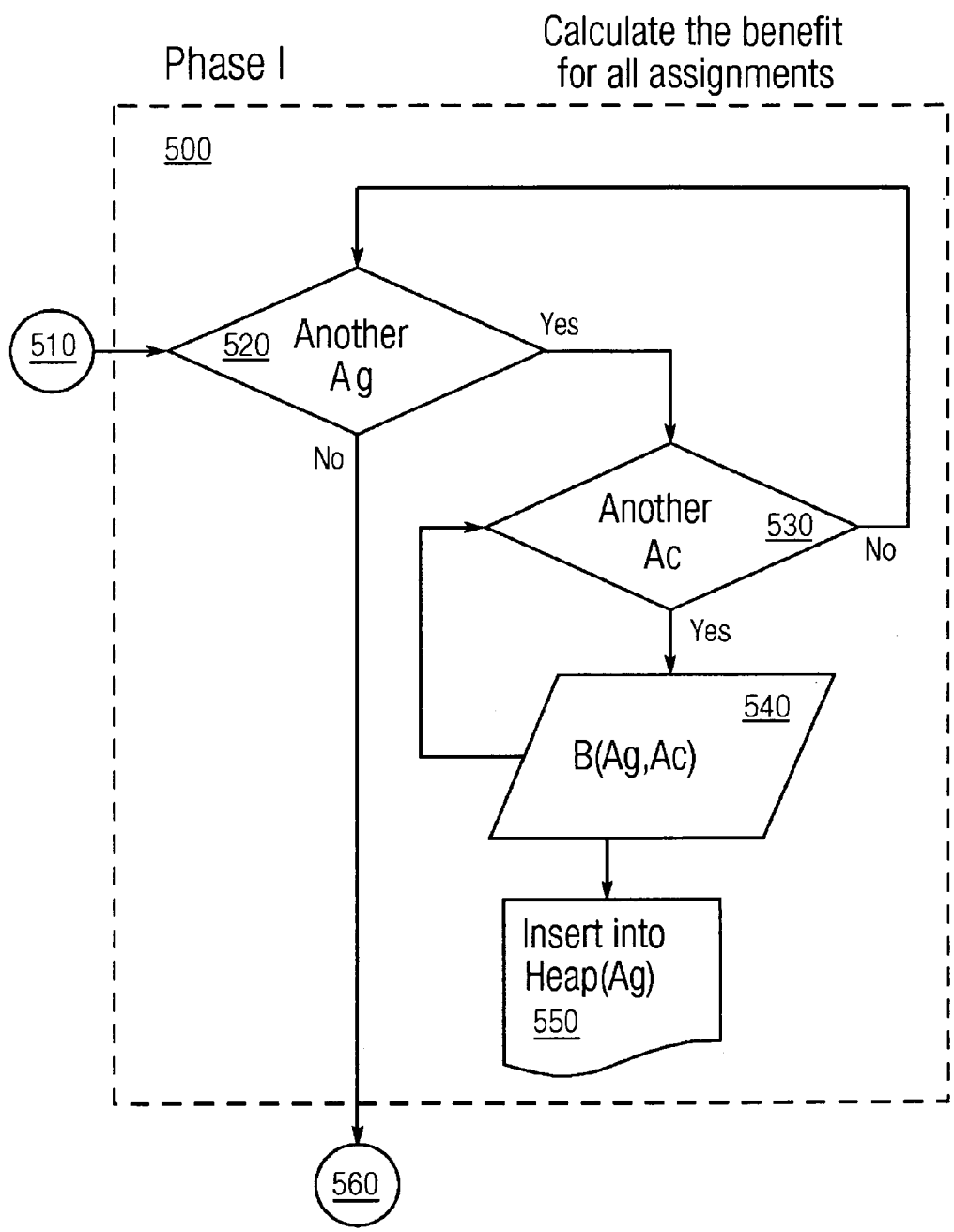
FIG. 5 is a block diagram view of pair creation and benefit Determination.

FIG. 5 shows a flowchart diagram 500 (phase I) for calculating a benefit for each assignment. A set of agents and the set of actions are received as parameters as input 510. A first query 520 begins iterating through the set of agents by asking if another agent exists in the set. For a positive response, the process continues to a second query 530 to iterate through the set of actions by asking if another action exists in the set. A negative response, corresponding to the end of the action set, returns the process to the first query 520 for the next agent in the set. For a positive response to the second query 530, the process calculates the benefit of assigning the current agent to the current action at calculation 540 to insertion 550 into the agent heap, subsequently returning to the second query 530 for another action on which to calculate another benefit at calculation 540. For a negative response to the first query 520, the process terminates at output 560 to indicate conclusion of the agents.

Figure 6:
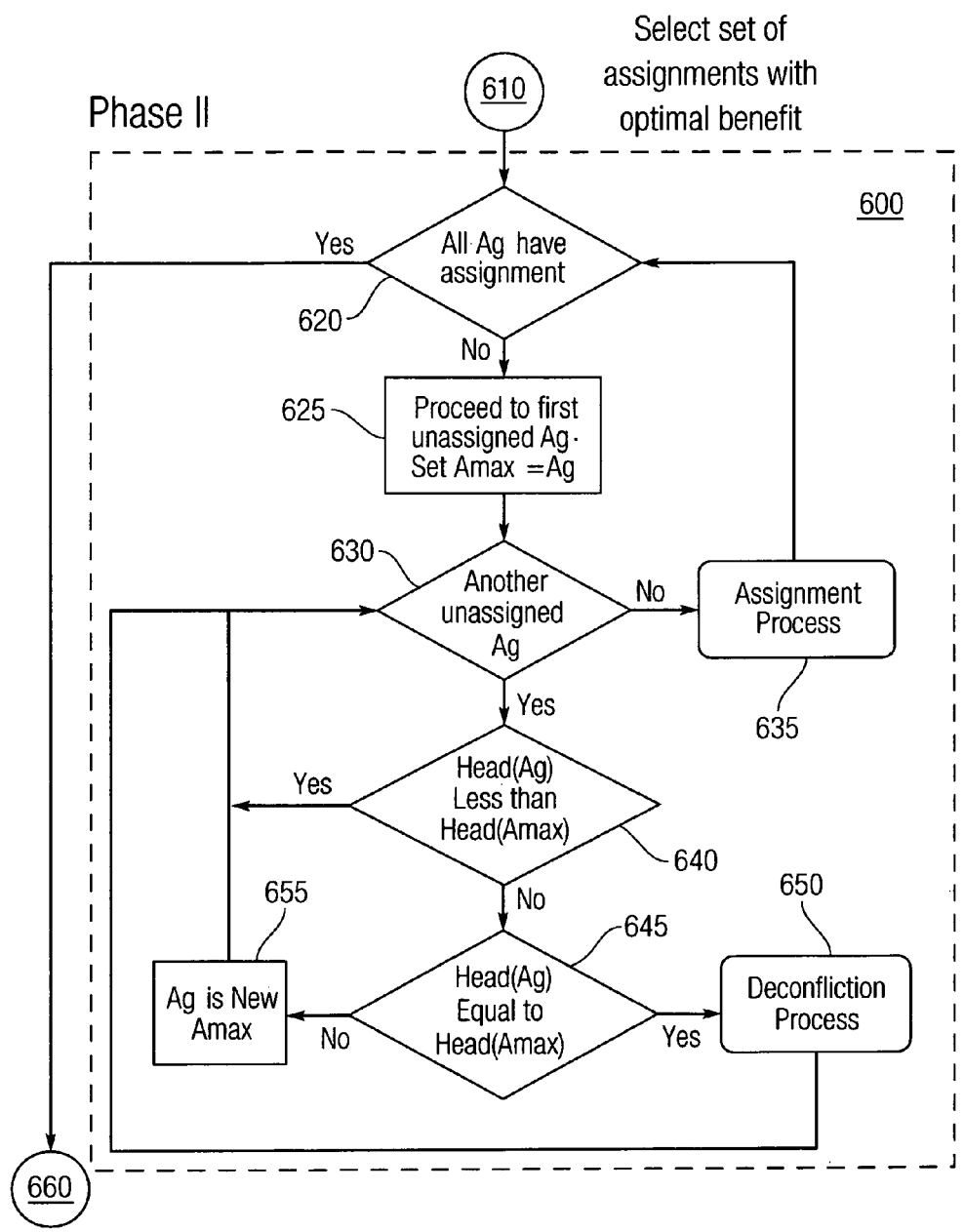
FIG. 6 is a block diagram view of Benefit Optimization.

FIG. 6 shows a flowchart diagram 600 (phase II) for selecting a set of assignments with optimal benefit. The set of heaps is received as input 610 from the process at the output 560. A first query 620 determines whether each agent has an assignment. For a negative response, the process continues to the first unassigned agent and automatically stores that agent for the next assignment 625. A second query 630 determines whether another unassigned agent exists. For a negative response, the process diverts to make an assignment from the Head( ) of the stored agent 635 (in phase IIb) and returns to the first query 620.

For a positive response to the second query 630, the process examines the next unassigned agent and proceeds to a third query 640 to determine whether the assignment represented by the head of the stored agent is more beneficial than that represented by the head of the agent under examination. For a negative response, the process refines the examination with a fourth query 645 to determine whether two assignments equal each other. For a positive response to the third query 640, the process concludes that no change is needed and returns to the second query 630. For a positive response to the fourth query 645, the process diverts to a deconfliction operation 650 (in phase IIa), followed by a return to the second query 630. For a negative response to the fourth query, the process must store the agent currently under examination as the most beneficial and returns to the second query 630. A positive response to the first query 620 (i.e., that all agents have been assigned) terminates the process at the output 660.

Figure 7A:
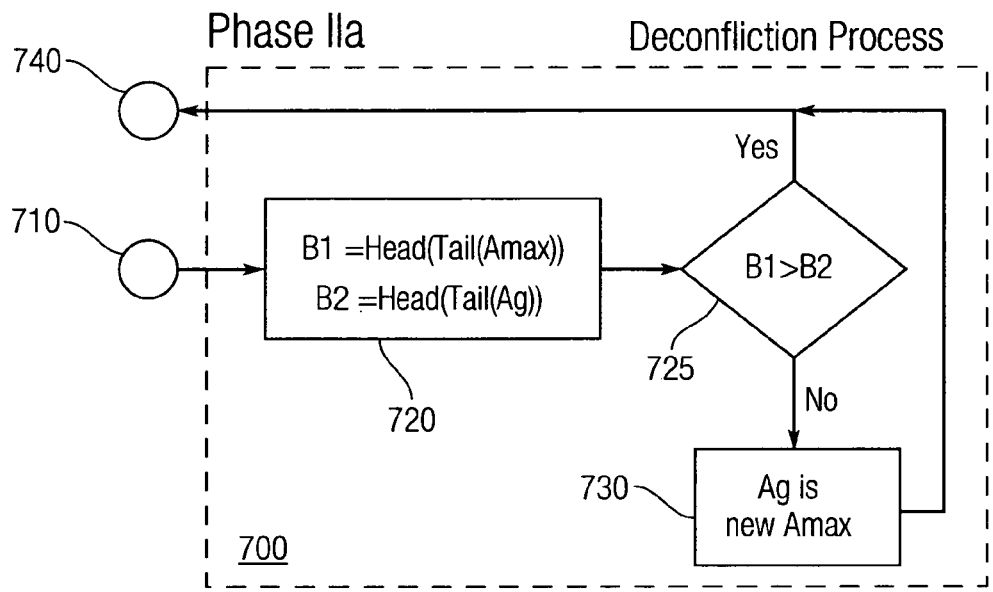
FIG. 7A is a block diagram view of Deconfliction.

FIG. 7A shows a flowchart diagram 700 for the deconfliction operation 650. The stored and currently examined agents are received as input 710 and an operation 720 calculates the benefit of the second assignment from each heap using the Head(Tail( )) method. A query 725 determines whether the second assignment from the stored agent exceeds the benefit of the second assignment of the currently examined agent. For a negative response, memory 730 stores the agent currently under examination as the most beneficial assignment and the process terminates at the output 740. For a positive response, the process also terminates at the output 740.

Figure 7B:
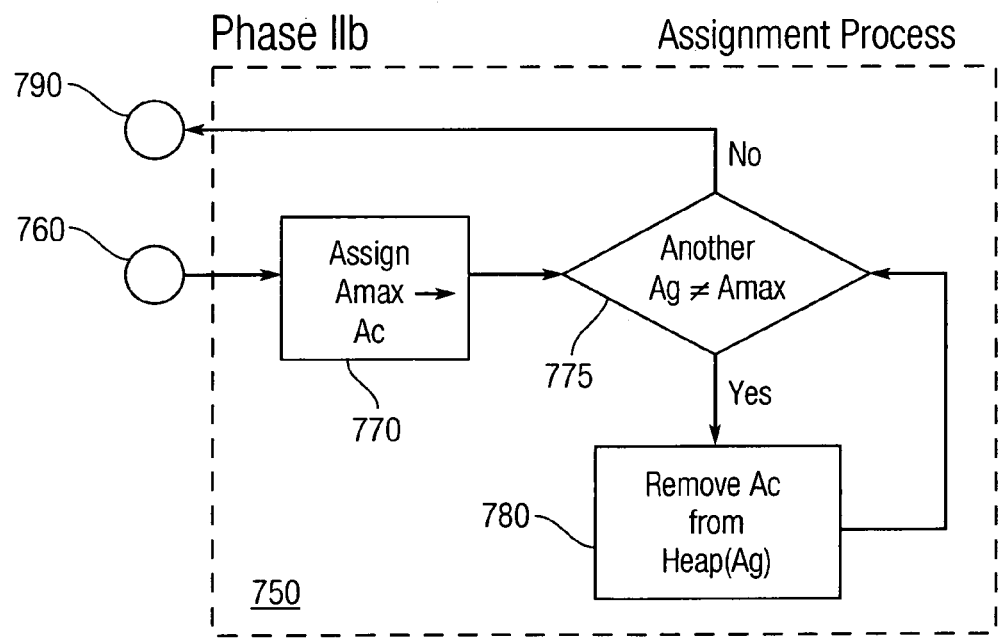
FIG. 7B is a block diagram view of Assignment.

FIG. 7B shows a flowchart diagram 750 for the assignment operation 635. The stored maximally beneficial agent is received as input 760, and the agent→action pair at the head of that heap is used for an assignment 770. The process continues to a query 775 that iterates through the unassigned agents by determining whether there are any another agents other than the stored maximum. For a positive response, a heap instruction 780 removes the newly assigned action from the agent heap and returns to the query 775. For a negative response, the process terminates at the output 790.

The optimization process may include the following steps: first, calculate benefit for all assignments; second, select the highest probability of benefits from among the heads of heaps; third, repeat the second step until all agents have an assignment. The stored assignments provide, on average, 92% of the optimal solution.

Calculating the assigned benefits in the first step includes: (a) iterative selection of every action Ac for each agent Ag; (b)

assessing the benefit of each action agent pair Ag→Ac; (c) dynamic storage of data in a heap for each agent as pairs of action-number and corresponding benefit value B; (d) limit of heap size to the order (i.e., the number) of agents |Ag|; and (e) order heaps with the head as the maximum value.

Selecting the highest probability of benefit from heads of heaps includes: (a) iterate through the unassigned heaps to determine the maximum benefit represented by the head of each heap; (b) deconflict where two heaps have the same potential benefit from the same action, including operations to calculate next greatest benefit for each heap and select from superior combination of the two assignments; (c) remove selected agent from next iteration; (d) removing selected action from remaining heaps; and (e) store assignment corresponding to selected benefit.

An optimal solution can be represented as a binary table indicating assignments rather than benefits. FIG. 8A shows an example binary assignment array 800 of a typical form of integer programming with a series of four columns. A list of actions ($Ac_1$, $Ac_2$, $Ac_3$) represents the first column 810. A binary value of one for an assignment or zero for no assignment can be inserted into each agent-to-action block of the array 800. The second column 820 shows an assignment of the first agent $Ag_1$ to the first action $Ac_1$. The third column 830 shows an assignment of the second agent $Ag_2$ to the third action $Ac_3$. The fourth column 840 shows an assignment of the third agent $Ag_3$ agent to the second action $Ac_2$.

Constraints can impose limitations on assignments. In some cases a row or column sum can also be constrained to impose some assignment behavior. The first kind of constraint requires that no agent assignment sum exceeds unity. The second kind of constraint requires that no action assignment sum exceeds unity. A first constraint assures that no agent can perform more than one action simultaneously. A second constraint indicates that only one agent can perform each action concurrently. In the absence of such a constraint a single action could be selected for multiple agents to each perform. The heap method imposes the first constraint automatically.

FIG. 8B shows an example benefit array 850 that indicates the expected benefit from each assignment. The list of actions ($Ac_1$, $Ac_2$, $Ac_3$) represents the first column 860. Each benefit block of the array 850 includes a decimal value, derived from the benefit function. The second column 870 includes benefit values for the first agent $Ag_1$. The third column 880 includes benefit values for the second agent $Ag_2$. The fourth column 890 includes benefit values for the third agent $Ag_3$.

The total benefit from the whole set of assignments can be determined through a single probability calculation that depends on the interdependency of each action. Assuming that each of these actions is completely independent of the other a sum of the product of assignments and benefits can be performed by multiplying each binary assignment term in the array 800 with the corresponding benefit term in the array 850. This can be expressed as: $1(2.2)+0(1.1)+0(0.02)+0(0.3)+0(0.25)+1(1.1)+0(0.05)+1(1.2)+0(1.1)=4.5$ total.

FIGS. 9A through 9D illustrate heaps 900 for examination and algorithm execution (after completion of phase I). FIG. 9A shows a set of heaps 910 for the three agents in the array 850. The parenthetical number pairs below the agents refer first to the action-number and second to the benefit value. These heaps are sorted with their maximum benefit in the head node. The tail nodes of the agents include the less beneficial assignments. The initial assumption of $A_{max}$ as the first agent $Ag_1$ at operation 625 is identified by oval 912.

As the algorithm executes (beginning at the phase II input 610) to select the highest value among the head nodes and remove the corresponding action from all heaps 910. As shown in FIG. 9B, the first assignment is performed (as initialization default at operation 625) for the first agent $Ag_1$ (with the action and benefit pair in bold font; this default operation 625 starts the iteration started, but does not necessitate that assignment, which may change many times during the loop from operations 630 to 655 or 650). Also, the remaining nodes for the first agent $Ag_1$, identified by dash oval 914, and the nodes for the second and third agents corresponding to the first action $Ac_1$ respectively identified by dash ovals 916 and 918, are removed in the heaps 920 (at assignment operation 635). In the next iteration examines the remaining heaps 920 in FIG. 9B (at query 630) to select the highest value that corresponds to the third agent $Ac_3$ associated with the second action $Ac_2$.

This leads to heaps 930 in FIG. 9C to set the second assignment for the third agent $Ag_3$ (also in bold), as well as removals of its corresponding tail nodes and any nodes associated with the second action $Ac_2$. In the final iteration, as shown in FIG. 9C, only a single heap for the second agent $Ag_2$ and its one remaining node that corresponds to the third action $Ac_3$. Nonetheless, the assignment should be considered (as this could be a negative and therefore lessen the value of the whole). At the conclusion in FIG. 9D for the assigned heaps 940 (in bold font), all assignments are shown to have been completed.

Ordering of a heap can be performed as a set of operations. First, each assignment has a benefit calculated (operation 540) for insertion into the heap (operation 550). Second, the optimal benefit can be determined from the set of assignments (determined from operation 630). Under select circumstances, conflicts in priority may be identified resolvable by supplemental deconfliction (650) and assignment (635) operations that call their respective subroutine processes (700, 750).

Figure 10:
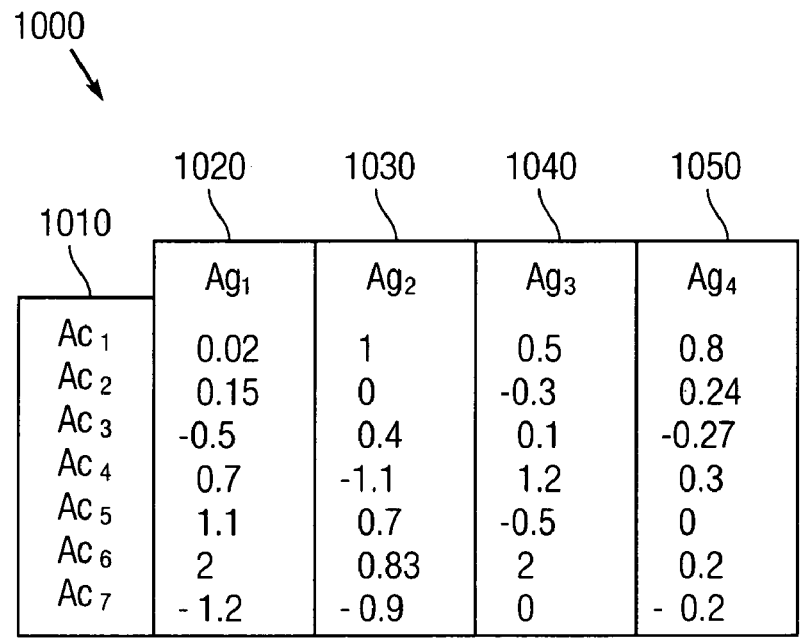
FIG. 10 is a tabular view of Agent and Action pairs with benefit values.

FIG. 10 illustrates another more intricate example array 1000 of the algorithm to more fully define the best operational mode. A list of actions ($Ac_1$, $Ac_2$, ..., $Ac_7$) represents the first column 1010. Each benefit block of the array 1000 includes a decimal value. The second column 1020 includes benefit values for the first agent $Ag_1$. The third column 1030 includes benefit values for the second agent $Ag_2$. The fourth column 1040 includes benefit values for the third agent $Ag_3$. The fifth column 1050 includes benefit values for the fourth agent $Ag_4$. Although there are seven elements in each heap (corresponding to the number of actions), the heaps each need only be of the size of the agent array, which in this case is four (corresponding to the number of agents). The ordered nature of the heaps means that only the four best elements are to be retained in the heaps. The array 1000 features maximum benefits at the sixth action $Ac_1$ for the first and third agents (both with benefit value of 2), and at the first action $Ac_1$ for the second and fourth agents (with respective benefit values of 1 and 0.8). These benefits correspond to the heads in their respective heap trees.

Figure 11A:
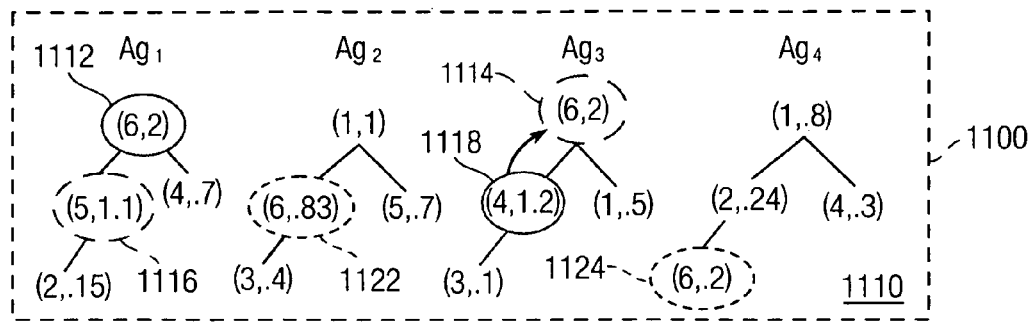
FIGS. 11A-11D are node-value views of heap operations.

FIGS. 11A through 11D show a series of heap operations 1100 based on the array 1000. FIG. 11A presents an initial set of heaps 1110. Heaps corresponding to the first and third agents have heads of equal value for the same action. The first agent $Ag_1$ has a first head node 1112 of (6, 2), as does the third agent $Ag_3$ with a second head node 1114 of (6, 2). The parenthetical values correspond to the corresponding sixth action $Ac_6$ (denoted by integer of 6 for both these heads) and the benefit value (both having a real number of 2.0). The equality of these heads necessitates the deconfliction process 700 for phase IIa. The first and third agents have respective first and second tail nodes 1116 of (5, 1.1) and 1118 (4, 1.2) that indicate their corresponding actions and respective benefits together. This potential for multiple assignments for the sixth action $Ac_6$ can be resolved, as provided by the deconfliction process 700 for phase IIa, to determine the best combination of first and second options.

The first option sums the values for nodes 1112 of the first agent $Ag_1$ and 1118 of the third agent $Ag_3$, corresponding to the selection of the first assignment $Ag_1 \rightarrow Ac_6$, as 2+1.2=3.2 total. The second option sums the values for nodes 1114 of the third agent $Ag_3$ and 1116 of the first agent $Ag_1$, corresponding to the selection of the second assignment $Ag_3 \rightarrow Ac_6$, as 2+1.1=3.1 total. The superior solution employs the first head node 1112 for retention (having the greater combined sum) and removes the second head 1114, to be replaced with the second tail node 1118 (directionally shown by a curved arrow) as the maximum alternate between the pair of options. The retained values in the set 1110 are denoted by gray continuous ovals around the nodes 1112 and 1118, and the discarded values by dash ovals around the nodes 1114 and 1116.

Figure 11B:
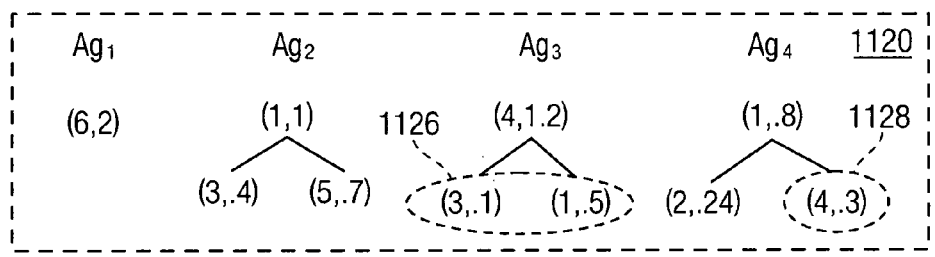
Figure 11C:
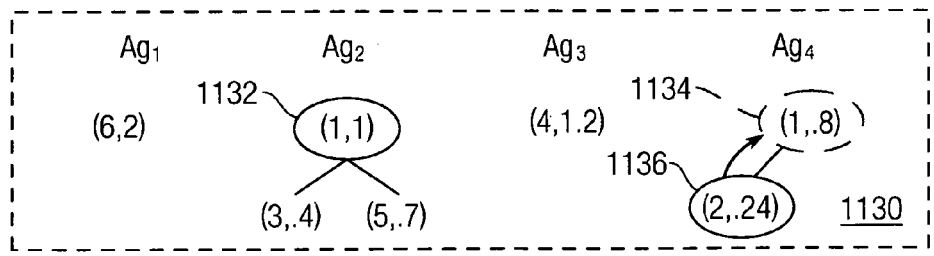

FIG. 11B presents an adjusted set of heaps 1120 subsequent to the first assignment of the $Ag_1 \rightarrow Ac_6$, removal of the tail for the first agent $Ag_1$ and removal of any remaining sixth action $Ac_6$ nodes from all other heaps, corresponding to the second agent $Ag_2$ and fourth agent $Ag_4$ as respective dash ovals 1122 and 1124. The next iteration begins to select the second highest head, which corresponds to the second assignment $Ag_3 \rightarrow Ac_4$. FIG. 11C presents an adjusted set of heaps 1130 subsequent to the second assignment of $Ag_3 \rightarrow Ac_4$, removal of the tail for the third agent $Ag_3$ as dash oval 1126 and removal of any remaining fourth action $Ac_4$ assignments from all other heaps, corresponding to the fourth agent $Ag_4$ as dash oval 1128. The next iteration begins to select the third highest head, which corresponds to the second agent $Ag_2$. Although each of the remaining heaps (for the second and fourth agents) has the same first action $Ac_1$ in the head nodes 1132 and 1134, the benefit value for the head 1132 is superior, thus negating any necessity of deconfliction.

Figure 11D:

FIG. 11D presents an adjusted set of heaps 1140 subsequent to the third assignment of $Ag_2 \rightarrow Ac_1$, removal of the tail for the second agent $Ag_2$ and removal of any remaining first action $Ac_1$ assignments from all other heaps (head node 1134 for the fourth agent). The remaining heap with substituted node 1136 as its head corresponding to the fourth agent $Ag_4$, becomes the fourth and final assignment of $Ag_4 \rightarrow Ac_2$. In the final assignments, the first agent $Ag_1$ performs the sixth action $Ac_6$ (with benefit of 2) the second agent $Ac_2$ performs the first action $Ac_1$ (with benefit of 1) the third agent $Ag_3$ performs the fourth action $Ac_4$ (with benefit of 1.2) and the fourth agent $Ag_4$ performs the second action $Ac_2$ (with benefit of 0.24). This determines a net benefit of the values sum 2+1+1.2+ 0.24=4.44.

Figure 12:
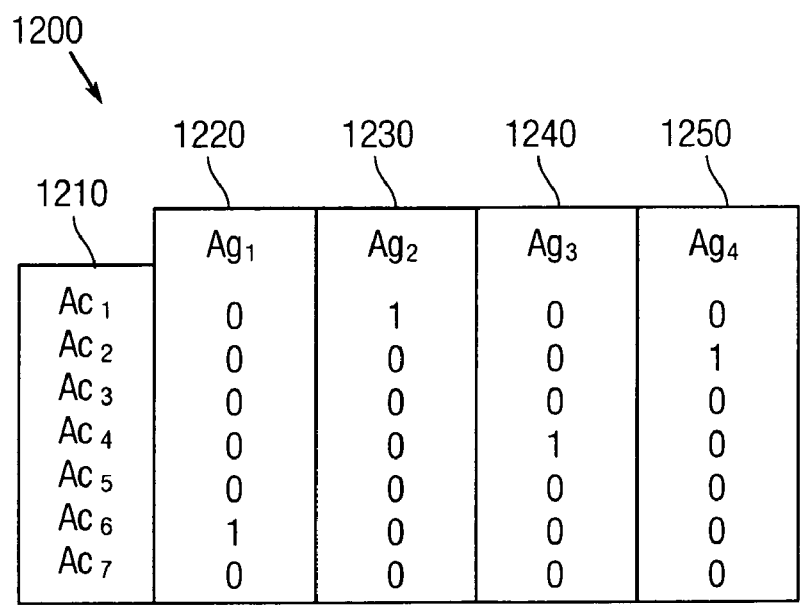
FIG. 12 is a tabular view of Agent and Action final assignment values.

FIG. 12 shows an assignment array 1200 corresponding to the heap sort performed and the assignment solution. A list of actions ($Ac_1, Ac_2, \ldots, Ac_7$) represents the first column 1210. The second column 1220 includes assignment values for the first agent $Ag_1$. The third column 1230 includes assignment values for the second agent $Ag_2$. The fourth column 1240 includes assignment values for the third agent $Ag_3$. The fifth column 1250 includes assignment values for the fourth agent $Ag_a$. The values are assigned such that each agent column sum is no greater than one. In this binary array 1200, the first agent $Ag_1$ is assigned to the sixth action $Ac_6$, the second agent $Ag_2$ to the first action $Ac_1$, the third agent $Ag_3$ to the fourth action $Ac_4$ and the fourth agent $Ag_4$ to the second action $Ac_2$.

(In this example, no assignment includes the fifth or seventh action.) This arrangement corresponds to the sort results in the final heap set 1140.

The heap sort engenders two advantages and two disadvantages over the conventional methods. The advantages are described as follows: First, the heap algorithm is many orders-of-magnitude faster computationally than the deterministic method. The algorithm increases in complexity only by the number of agents, whereas both deterministic and heuristic methods depend on both agents and actions. Second, the average degree of accuracy can be limited below 8% error and in most cases can be significantly below 2% error. This produces for heap sort an exceptionally accurate and predictable error rating which is an improvement on any heuristic algorithm.

The primary disadvantage lies in the error rating. Although the average case has very low in error, the individual results may be quite varied and yield high error. In a set of comparison experiments, the heap method was compared with a deterministic method in the naval domain, called Probabilistic, which selects the optimal assignment set which has the highest probability of kill as the benefit. The highest degree of error observed in example calculations produced 55% of the optimal answer, corresponding to a 45% error. However, this circumstance occurs only very infrequently in low orders of agents w (for weapons) and actions t (for targets). For increases of w and t in general, the error decreases rapidly.

The second disadvantage, as with most heuristic algorithms, corresponds to the inability to determine the proximity of the approximated optimal answer to the correct solution. For any single calculation, whether the result indeed represents the optimal answer cannot be established. Thus, in low-order problems, where the calculation time does not present a limiting factor, another more accurate algorithm might be selected. The extent of difference between result and the optimal answer also cannot be established. For that reason alone, the heap algorithm is constrained by uncertainty for individual calculations. However, when applied uniformly over a period of time (with multiple calculations), the algorithm yields a low and acceptable average error, and with much less computation time than conventional techniques.

The heap algorithm might be used in conjunction with several other methods. For circumstances in which branch-and-bound becomes too cumbersome for high-order problems, the rapid calculations of a likely perfect answer by the heap algorithm can be used as a bound for the branch-and-bound algorithm. In this way inferior answers might be pruned quickly and the branch-and-bound algorithm might more quickly ascertain the true optimal answer.

The heap sort algorithm has been developed for situations in which the number of actions equals or exceeds the number of agents. This assumes that the row sum be limited to a maximum of unity. These assumptions yield less accuracy for situations in which the optimal solution may include more than one agent assigned with the same action. Removing the row sum constraint may enable the heap sort algorithm to operate satisfactory for low orders of agents and actions by omitting conflict checks of the same benefit and removing selected actions from the heap.

Limits of Error: The error of the heap algorithm varies from run-to-run and cannot be predicted with precision. However, the algorithm's accuracy can be expressed as an average error for a set of runs. Each of the plotted points in the graphs described herein represents the error for a sample set of five-thousand runs and statistical calculations on that sample. From this sample, all zero-error cases were removed so that only the erroneous solutions could be analyzed. Thus, these calculations are pertinent to error alone rather than an average case for the whole set.

Figure 13A:
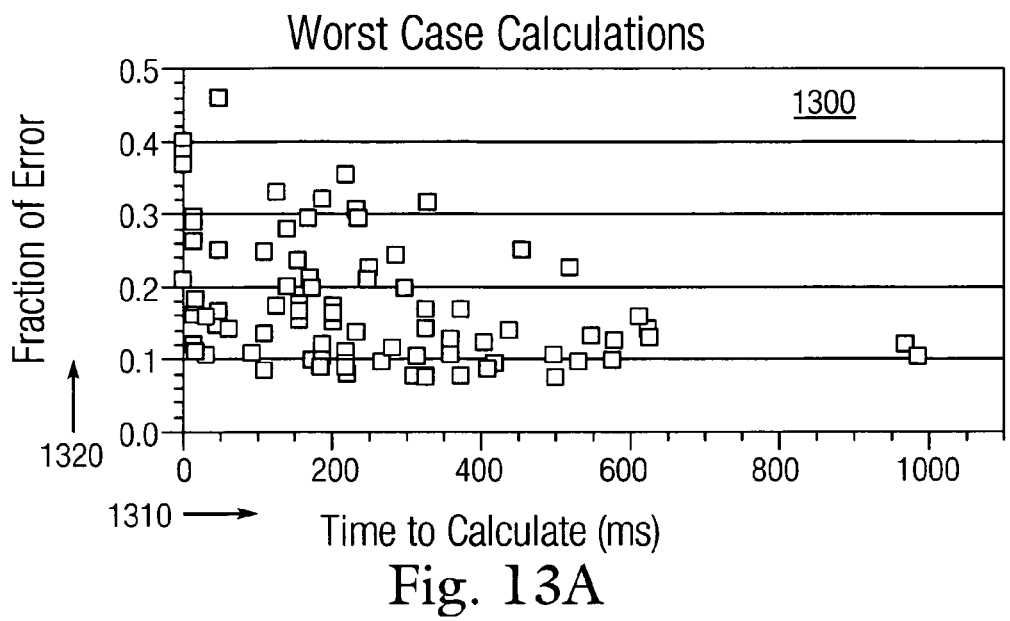
FIG. 13A is a scatter-plot view of error for worst case calculations.
Figure 13B:
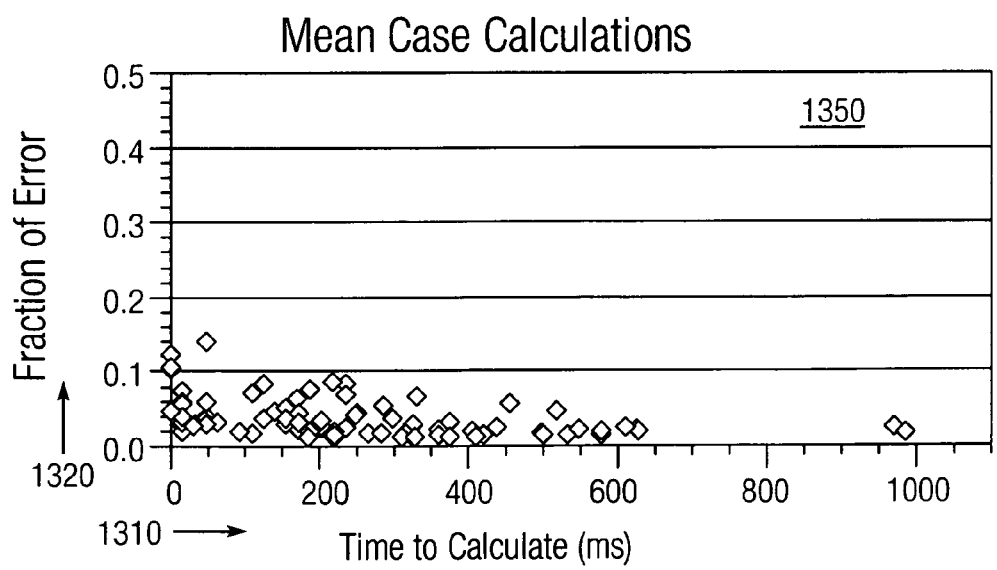
FIG. 13B is a scatter-plot view of error for mean case calculations.

Error values can be compared to calculation time for the heap sort. FIG. 13A plots a first graph 1300 of worst-case error fraction, with calculation time in milliseconds as the abscissa 1310 and error fraction as the ordinate 1320. The open squares represent worst-case error data for example calculations. These worst-case errors gradually taper with increasing time to about 10%; although at early times reach 45%. FIG. 13B plots a second graph 1350 of average error fraction with the same scales as the first graph 1300. The open diamonds represent average error data. The average error is very low for most of the data, indicating the exceptional nature of the worst-case error.

Figure 14A:
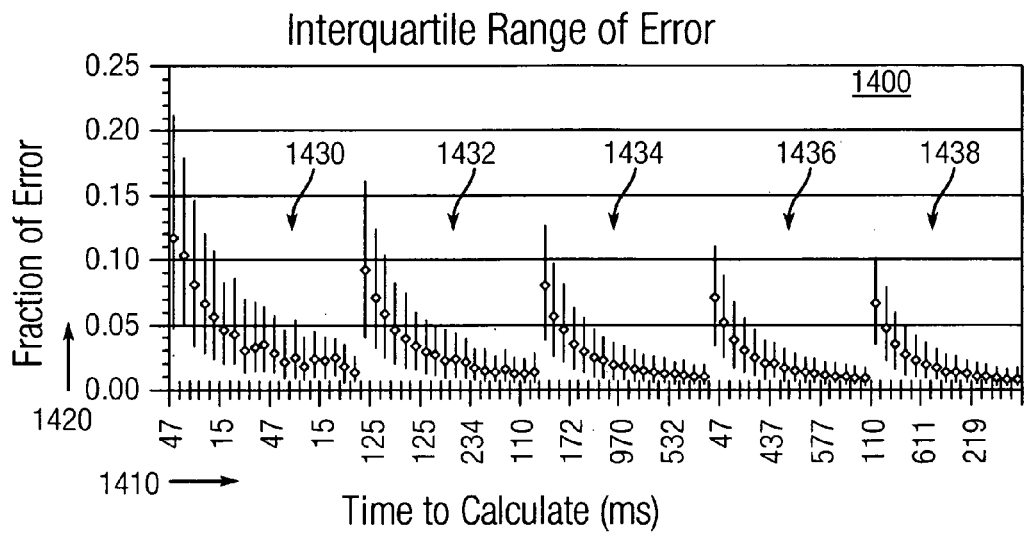
FIG. 14A is a graphical view of error range ordered first by numbers of weapons and second by numbers of targets.

FIG. 14A plots a third graph 1400 of inter-quartile range (IQR) as an error fraction. The abscissa 1410 is calculation time scaled to particular numbers of weapon agents. The ordinate 1420 is error fraction. Sets of data reveal average values denoted by an open diamond and vertically bounded by error ranges. The data groups distinguish between two weapons 1430, three weapons 1432, four weapons 1434, five weapons 1436 and six weapons 1438.

In each data group the number of targets increases from t=w on the left to t>>w on the right. The IQR reveals a very limited range for error in all calculations. Nearly all of the data have an IQR limited to less than ten-percent (<10%) error.

Figure 14B:
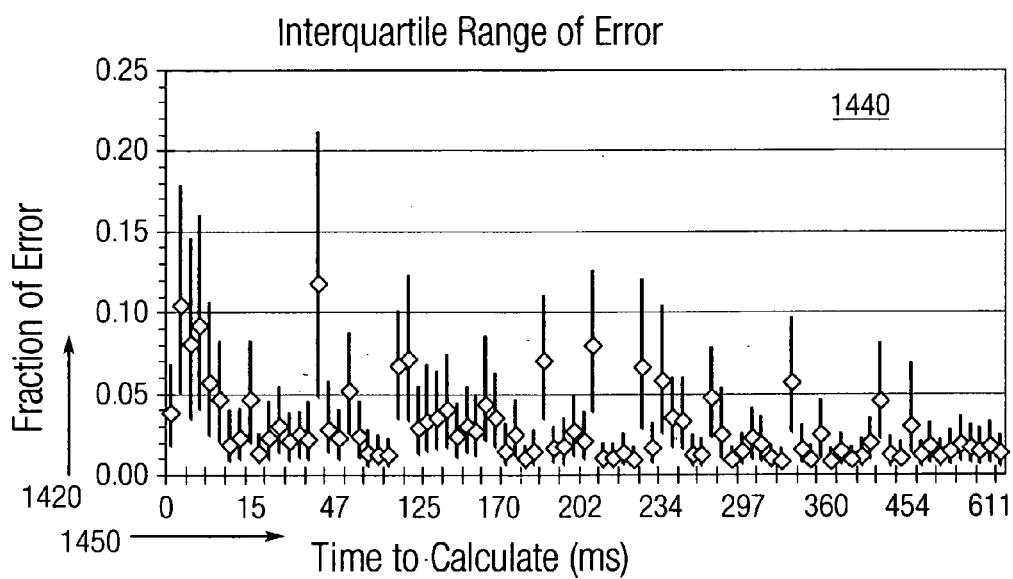
FIG. 14B is the same data as 14A ordered by calculation time.
Figure 14C:
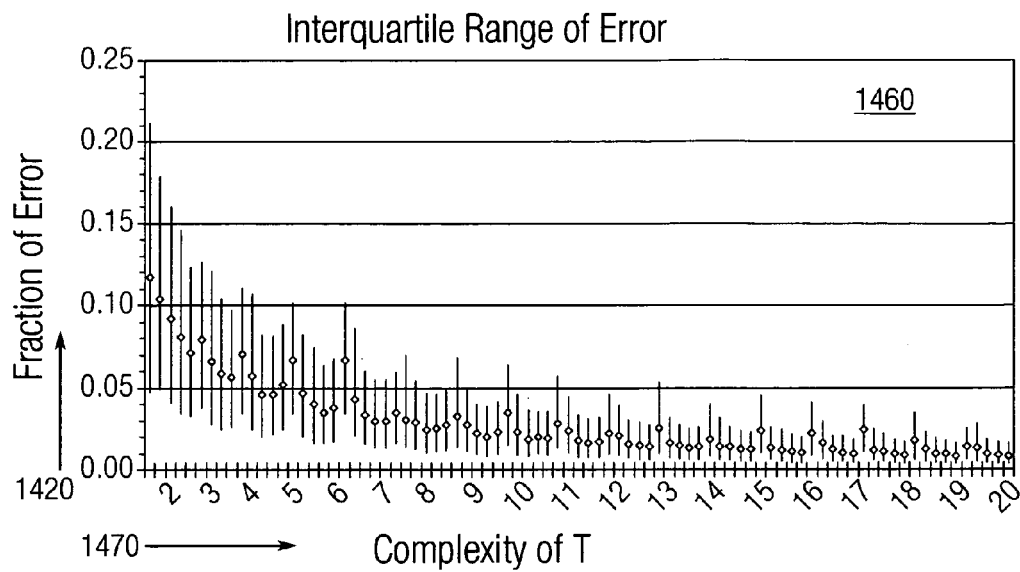
FIG. 14C is the same data as 14A ordered first by number of targets and second by numbers of weapons.

As can be observed, error increases as the w number of weapons (agents) approaches the t number of targets (actions). FIG. 14B plots a fourth graph 1440 of IQR as an error fraction with the same ordinate 1420 as in the third graph 1400, but a continuous calculation time as the abscissa 1450. This illustrates the interaction between proximate values of weapon agents and target actions regarding error. FIG. 14C plots a fifth graph 1460 of IQR with the same ordinate 1420 as the third graph 1400, but employing number of targets as the abscissa 1470.

Generally, an increasing t number of target actions trends with error reduction, particularly for such a number exceeding the corresponding w number of weapon agents. The points closest to the ordinate 1420 in the fifth graph 1460 correspond to w=t=2, which presents a counter-example of error exceeding 10%. The few IQR values that extend beyond 10% all represent the highest error and highest deviation in which w≠t, such that the agents and actions approach each other in quantity.

For the fifth graph 1460, the mean error for all weapon numbers shows an obvious trend of rapid reduction of error into the range of 1-2%. This trend is partially attributed to the error-generating factors in the heap algorithm. In some circumstances in which one assignment precludes a slightly better total allocation by ignoring a better individual allocation, the algorithm may produce significant error. As the number of possible allocations increase with t target actions and w weapon agents, the probability of yielding such a situation diminishes, leading to a reduction in large error bounds and a significant decrease in average error.

Calculation Time: To compare the probabilistic and heap techniques, calculations were performed for random data sets for both paradigms. The time for calculation was recorded for each random data set accordingly. For each data set d, the respective probabilistic and heap times $\tau_d^P$ and $\tau_d^H$ were recorded in milliseconds. Then the cumulative times T for all data sets were summed for the whole of five-thousand calculations. The probabilistic and heap cumulative times are expressed as $$T^P = \sum_d^{5000} \tau_d^P \text{ and } T^H = \sum_d^{5000} \tau_d^H,$$

respectively. These are times captured in these data points. They are therefore indicative of the order of milliseconds which each type of calculation requires for a more general problem.

Figure 15:
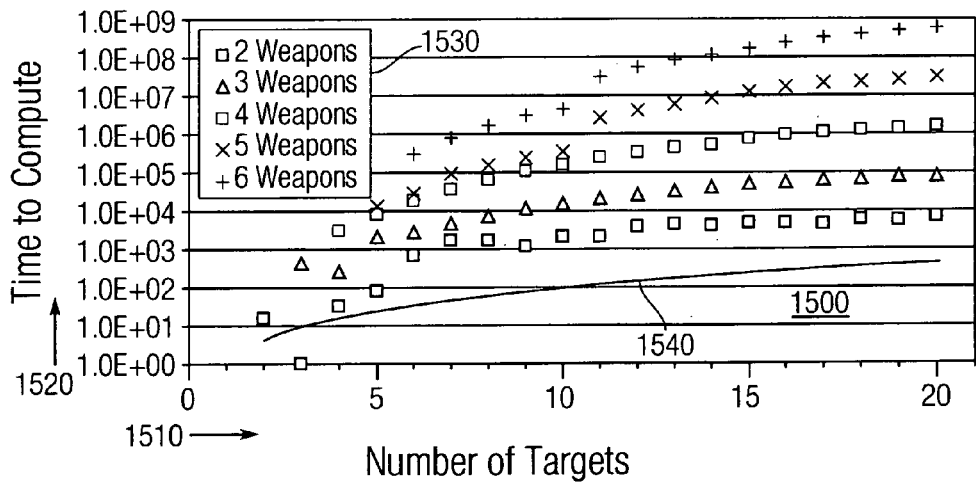
FIG. 15 is a graphical view of calculation time of the Probabilistic method for target complexity.

FIG. 15 plots a sixth graph 1500 comparing target complexity with probabilistic computation time. The abscissa 1510 represents the t number of target actions (up to twenty) and the ordinate 1520 represents the cumulative computation time to a solution in milliseconds. A legend 1530 identifies symbols for different w number of weapon agents. In particular, filled squares denote two weapons, filled triangles denote three weapons, open squares denote four weapons, saltires denote five weapons, and crosses denote six weapons.

The graph 1500 shows the effects of w weapons and t targets on the probabilistic calculation time. The probabilistic cumulative time $T^P$ increases significantly with respect to t for each value of w. Comparison of an exemplary second-degree polynomial line 1540 shows each order of w appears to increase the exponent. Thus probabilistic cumulative time $T^P$ depends on both w and t, with t increasing the probabilistic calculation time according to some degree of w.

Figure 16:
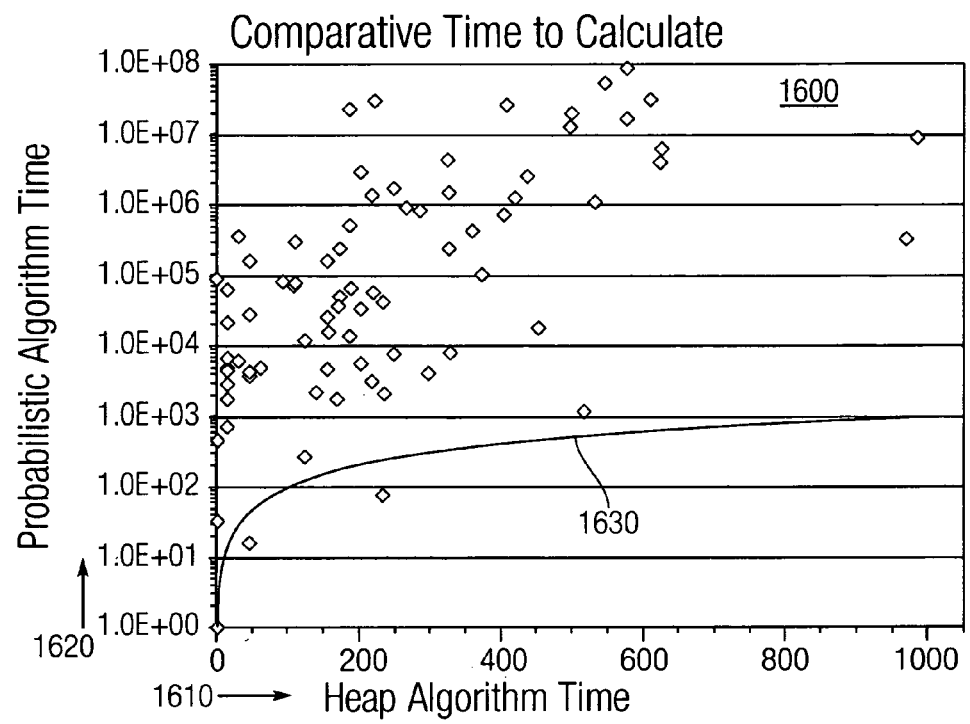
FIGS. 16, 17 and 18 are scatter-plot comparison views of probabilistic and heap calculation times.

FIG. 16 plots a seventh graph 1600 comparing probabilistic and heap cumulative calculation times, both in milliseconds, to their solutions. The abscissa 1610 represents heap sort calculation time in linear scale, and the ordinate 1620 represents the probabilistic calculation time in logarithmic scale. A comparison logarithmic curve 1630 represents the directly proportional relation of identical heap and probabilistic cumulative times as $T^H=T^P$. Most of the probabilistic calculation times exceed by several orders of magnitude the curve 1630, thereby demonstrating the improved computational efficiency of the heap sort.

Figure 17:
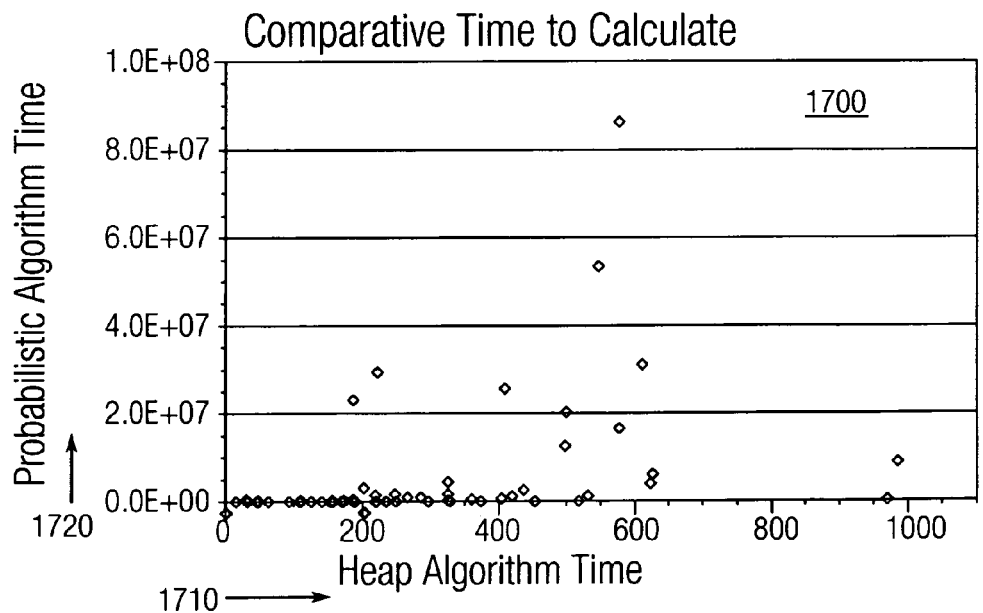
Figure 18:
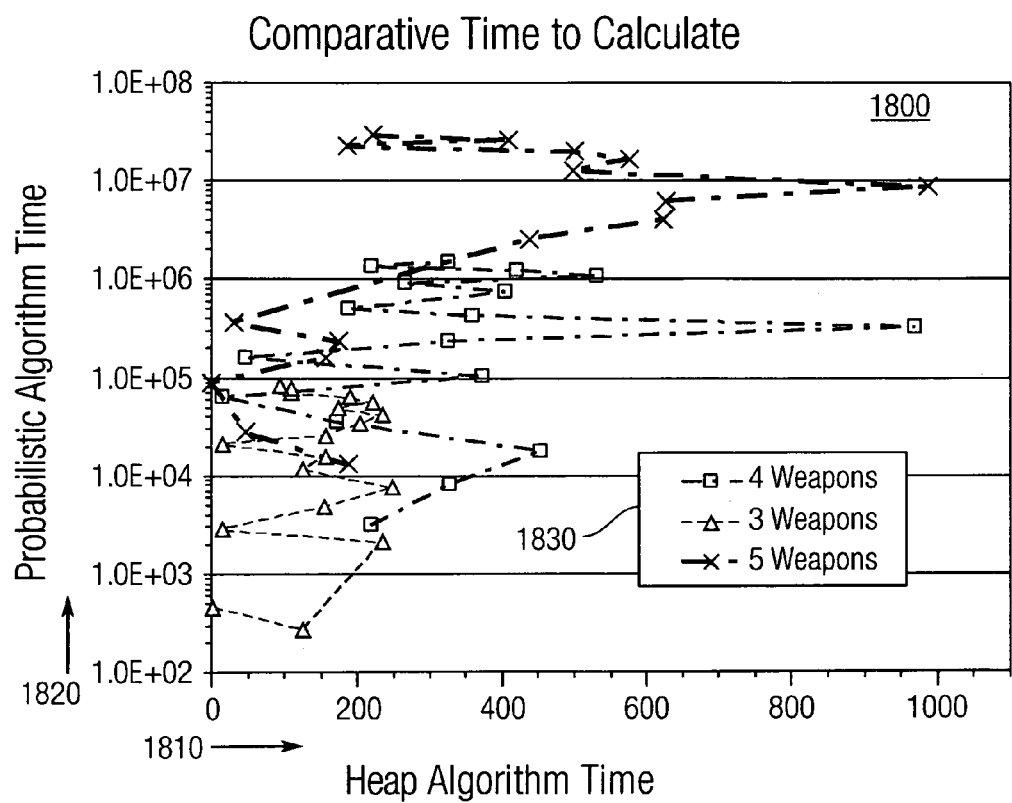

FIG. 17 provides an eighth graph 1700 having the same comparative data as the seventh graph 1600, but alternate scales. The abscissa 1710 represents heap sort calculation time in linear scale extending to about $10^3$, and the ordinate 1720 represents the probabilistic calculation time also in linear scale but extending to $10^8$, or about five orders of magnitude greater than the heap sort times. FIG. 18 provides a ninth graph 1800 having the same comparative data as the eighth graph 1700 with w number of weapons distinguished. The abscissa 1810 represents heap sort calculation time in linear scale extending to about $10^3$, and the ordinate 1820 represents the probabilistic calculation time in logarithmic scale extending to $10^8$ for isolated sets of time data. A legend 1830 identifies symbols for different w number of weapon agents. In particular, filled triangles denote three weapons, open squares denote four weapons, and saltires denote five weapons. The value of t number of target actions varies between four and twenty. As t grows, the value of heap cumulated calculation time $T^H$ varies erratically without apparent pattern, whereas probabilistic cumulated calculation time $T^P$ rises as t increases.

Figure 19:
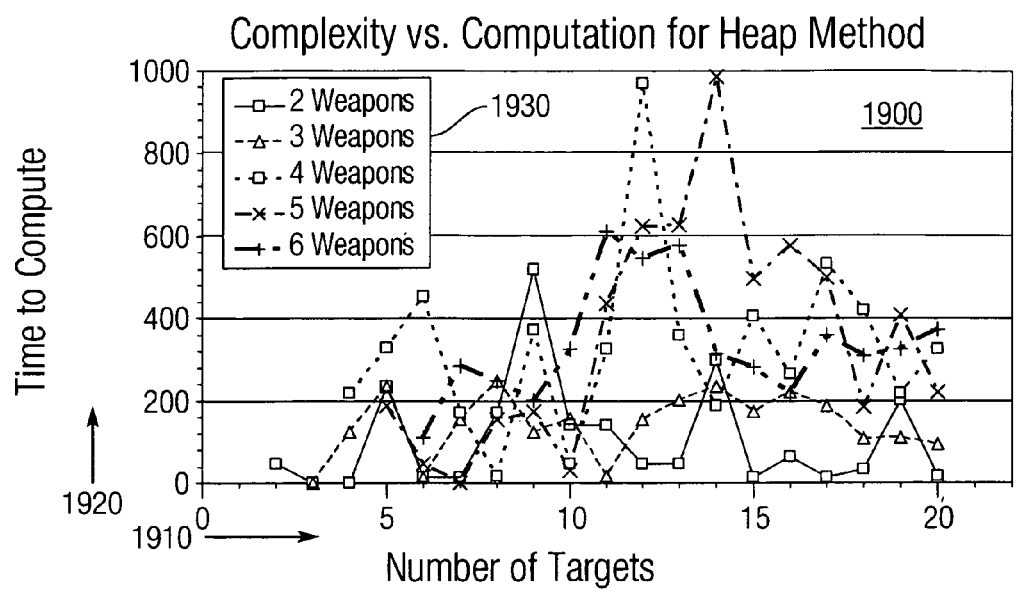
FIG. 19 is a graphical view of heap calculation time for target complexity.

FIG. 19 provides a tenth graph 1900 of heap computation time with increasing action complexity. The abscissa 1910 represents the number t of target actions, and the ordinate 1920 represents the heap cumulative calculation time in milliseconds. A legend 1930 identifies symbols for different w number of weapon agents. In particular, filled squares denote two weapons, filled triangles denote three weapons, open squares denote four weapons, saltires denote five weapons, and crosses denote six weapons. Although this too is altogether erratic to define a pattern, the time does tend to increase with w.

Figure 20A:
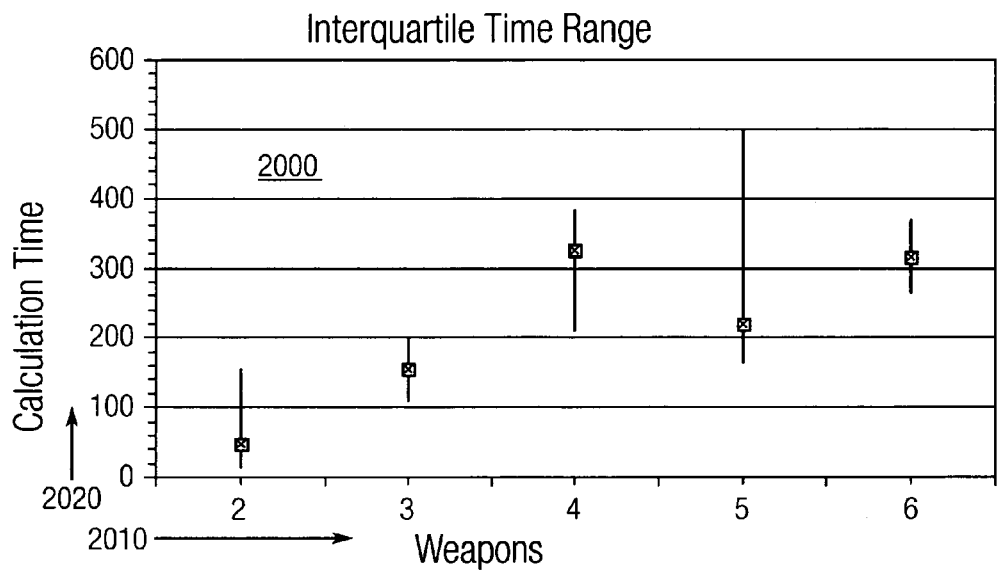
FIG. 20A is a graphical view of heap calculation time range for weapons.
Figure 20B:
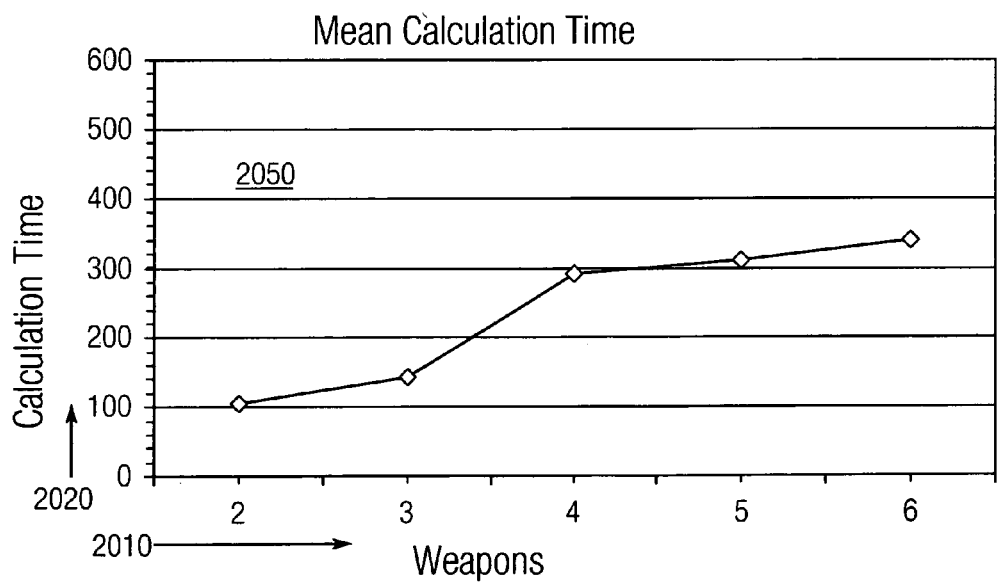
FIG. 20B is a graphical view of heap mean calculation time for weapons.

FIG. 20A shows an eleventh graph 2000 for IQR sensitivity to weapons. The abscissa 2010 represents the number w of weapon agents, and the ordinate 2020 represents calculation time in milliseconds. Similarly, FIG. 20B shows a twelfth graph 2050 for mean calculation time sensitivity to weapons, with the same abscissa and ordinate as the eleventh graph 2000. Statistical calculations on IQR and mean calculation times for the heap sort for each value of w weapons reveals generally increasing trends in calculation time. Considered as a range of values, calculation time increases with w, which is less apparent in the tenth graph 1900. Thus, heap cumulative time $T^H$ depends on w, but not on t.

In order to characterize calculation time, Big-O (order) analysis was performed on each algorithm. The probabilistic method consists of two parts: the first involves calculating the shooting solution; the second determines the expected value for each shooting solution. As this second step can be performed in constant time, that offset can be neglected. Determination of shooting solutions can be simplified by selecting one of t targets for each w weapon (or t multiplied by itself w times, or t actions to the w exponent power), which is of order $O(t^w)$.

The heap algorithm consists of two stages: the first stores the kill probability $p_k$ values in separate heaps for each w weapon; the second extracts the data of n nodes from the heaps again. The first step involves the creation of a heap which is of order $O(\log_2 n)$. However in this case, the heap time truncates to order w so that this step is only of order $O(\log_2 w)$. The second step exhibits the greatest variability and depends a largely on the individual data set. At worst, the step involves an order $O(w^2)$ operation, but at best is merely order $O(w)$. Therefore for the heap algorithm, the worst term is of order $O(w^2)$, but can be as low as order $O(w)$. This result remains consistent with the observations that indicate an increase associated with w, but can be variable due to the indeterminate length of the second stage.

Figure 21:
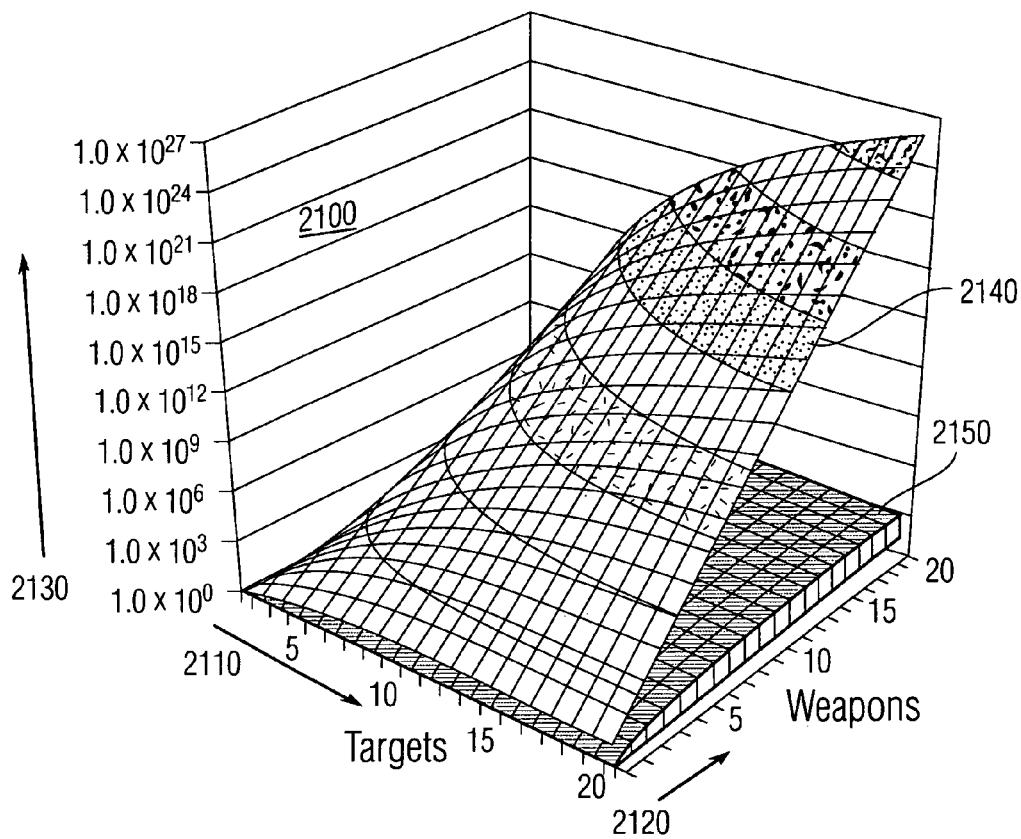
FIG. 21 is an isometric surface plot of time comparisons for probabilistic and heap calculation times.

FIG. 21 presents an isometric surface contour plot 2100 comparing sensitivity of probabilistic and heap computation times with numbers of targets and weapons as independent variables represented by a horizontal plane. The first abscissa 2110 represents the number w of weapon agents, the second abscissa 2120 represents the number t of target actions, and the ordinate 2130 represents theoretical calculation time in milliseconds. The contour plot 2100 presents on a common scale two functions: probabilistic function p(t, w) contour 2140 and heap h(t, w) contour 2150.

As evident from the contour plot 2100, the heap contour 2150 shows increase with w weapons and lack of dependence on t targets, whereas the probabilistic contour 2140 compounds increases with both parameters. The heap contour 2150 reaches time level of four-hundred milliseconds at w=20 irrespective of t, with a sensitivity to weapons within the range $w \leq h(t, w) \leq w^2$. By contrast, the probabilistic contour 2140 extends beyond $10^{26}$ milliseconds at t=w=20. (By comparison, the estimated age of the universe is only about $4.3 \cdot 10^{20}$ milliseconds.) The sensitivity of probabilistic time can be characterized by exponential function $p(t, w)=t^w$ that increases rapidly.

Cumulative Trends in Error and Risk: The summation of certain trends often leads to more unusual trend that better defines the situation. The limits of error (as described for graphs 1300 and 1350), relates to erroneous data to define the nature of that error. For error trends and risk, the optimal solutions found by the heap algorithm are compared to determine the expected frequency of error and the total error risk to any system using the heap algorithm.

Figure 22:
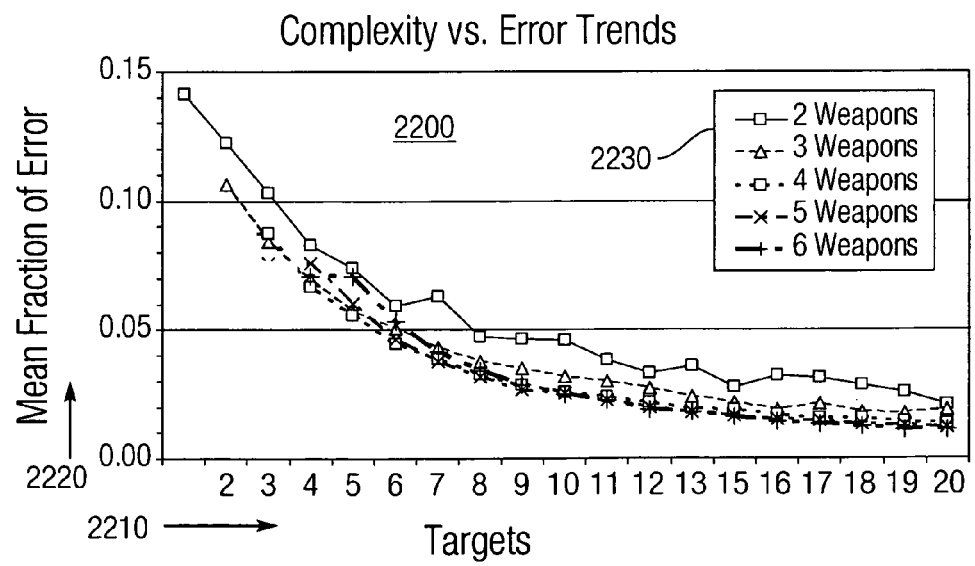
FIG. 22 is a graphical view of heap error trends for target complexity.

FIG. 22 provides a thirteenth (non-contour) graph 2200 of error trends with increasing action complexity for the heap algorithm. The abscissa 2210 represents the number t of target actions, and the ordinate 2220 represents mean fraction of error. A legend 2230 identifies symbols for different w number of weapon agents. In particular, filled squares denote two weapons, filled tri-angles denote three weapons, open squares denote four weapons, saltires denote five weapons, and crosses denote six weapons. The heap mean error generally decreases asymptotically with increasing t target actions (for $t \geq w$) and also decreases with increasing w agent actions.

Figure 23:
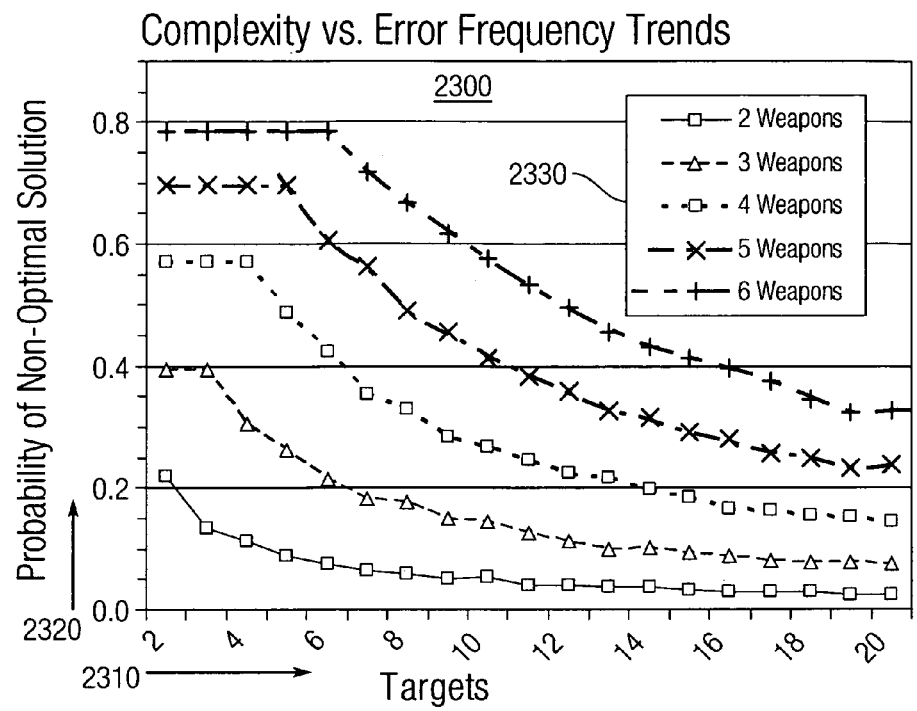
FIG. 23 is a graphical view of probability of a non-optimal heap solution for target complexity.

Probable error can be distinguished from probability of non-optimal solution. FIG. 23 shows a fourteenth (non-contour) graph 2300 of error frequency trends with complexity in number of target actions. The abscissa 26310 represents the number t of target actions, and the ordinate 2320 represents the probability of non-optimal solutions. A legend 2330 identifies symbols for different w number of weapon agents. In particular, filled squares denote two weapons, filled triangles denote three weapons, open squares denote four weapons, saltires denote five weapons, and crosses denote six weapons. The probability of error generally rises with increasing w number of weapons diminishes with increasing t number of targets.

Concerns regarding error frequency arise from the fact that, as with most greedy algorithms, the heap algorithm produces the correct answer only on occasion. In most cases, especially where t is very high, the algorithm can be expected to produce the correct result upwards of 95% of the circumstances. The trend in the graph 2300 shows that as t increases, the probability of a non-optimal solution actually decreases. However, in terms of w, that solution trend reverses, showing a natural disposition to increase the probability of a non-optimal solution with rising w. The increase appears to be without bound up to a perfect probability. The fifteenth graph and 2300 shows the probability of non-optimal solution generally rise with increasing w number of weapons diminishes with increasing t number of targets.

Due to a lack of proof that all answers are incorrect for any value of w, a worst case can be assumed to set no bound on the percentage of wrong answers. However, the trends show that as t increases, this error probability decreases rapidly. In addition, the trend identified in graph 2100 shows minimization the degree of error in correlation with an increase in t or w. This trend tends to augment the error-reducing effect of t in graph 2300, while mitigating the increase effect for w.

Figure 24:
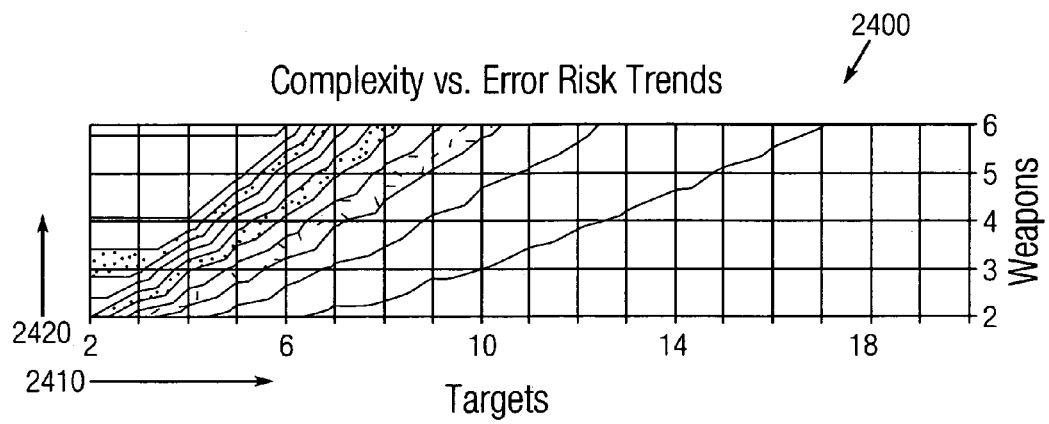
FIG. 24 is a contour plot (in plan view) of probable heap error.
Figure 25:
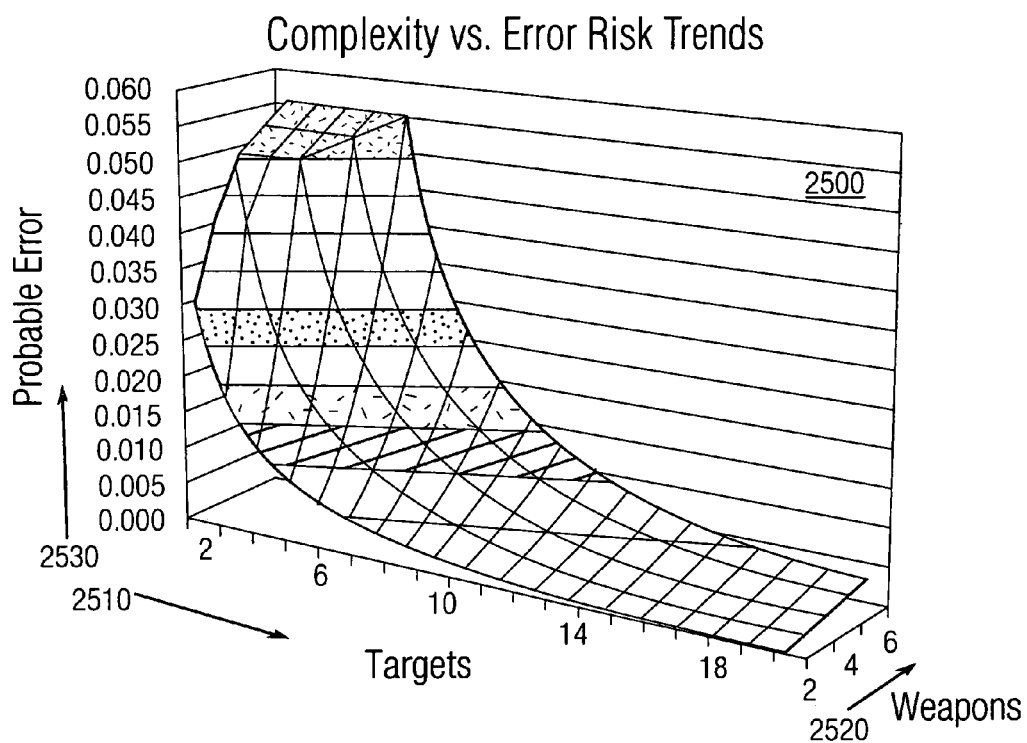
FIG. 25 is an isometric surface plot of probable heap error.

FIGS. 24 and 25 present respective planar and isometric contour plots of error risk as a function of complexity (from agents and actions). FIG. 24 shows a contour graph 2400 with shading levels of probable error. The abscissa 2410 represents the number t of target actions, and the ordinate 2420 represents the number w of weapon agents. The error levels increase from minimal values in the lower right corner (for maximum difference t−w→18+) to maximum values towards the upper left region (for minimal difference t−w=0). FIG. 25 shows a surface graph 2500 with geometrical levels of probable error. The first abscissa 2510 represents the number t of target actions, the second abscissa 2520 represents the number w of weapon agents, and the ordinate 2530 represents probable error, ranging up to 6%.

Figure 26:
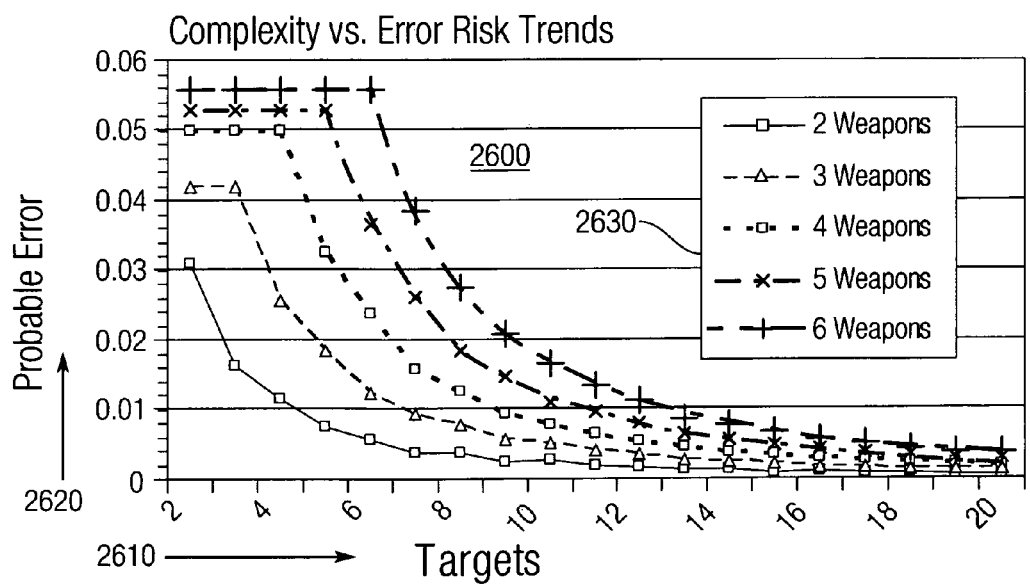
FIG. 26 is a graphical view of probable heap error for target complexity.

In comparison, FIG. 26 shows a fifteenth (non-contour) graph 2600 of error risk with complexity in number of target actions. This presents a line graph analogous to the surface graph 2500 from left side. The abscissa 2610 represents the number t of target actions, and the ordinate 2620 represents the probable error as a fraction of the solution. A legend 2630 identifies symbols for different w number of weapon agents. In particular, filled squares denote two weapons, filled triangles denote three weapons, open squares denote four weapons, saltires denote five weapons, and crosses denote six weapons. These values indicate the error risk. Error risk is the combination of probability of occurrence, shown in the fourteenth graph 2300, and the consequence of occurrence, shown in the tenth graph 2100.

The definition of error risk depends on two variables: probability of an event and the consequence (from limiting error trends) of the event. These two factors can be combined to accurately predict the expected values of error for any data set. These values represent merely an average that can be expected out of many trials, and individual error ranges may be larger or smaller than average. However, even with these qualifications, the results are extremely encouraging.

The trend shows that although the initial error rating nonetheless increases for values of w, the error risk actually remains limited. Thus, although the probability of an error increases, the value of that expected error decreases. This indicates that a natural bound exists between 6% and 8% error. In addition, the combined trends create such a steep drop off in error that the algorithm can be expected to return an answer which is 99% accurate in most cases.

Summary of analysis: The heap-sorted optimization algorithm is highly accurate, especially as the values of w and especially t increase. For low values of t, the algorithm can be expected to create a large number of non-optimal solutions as w increases, but the average degree of error remains very low. Because the heap algorithm provides a good approximation of the probabilistic answer while requiring several magnitudes less time to compute the approximation, this process represents an advantageous procedure with which to determine the optimal solution. At any rate, conditions in which a finite number of agents (e.g., w weapons) must be selected among a larger number of actions (e.g., t targets), the heap algorithm may be used to create a rapid, near-perfect approximation of the actual optimal answer.

Figure 27:
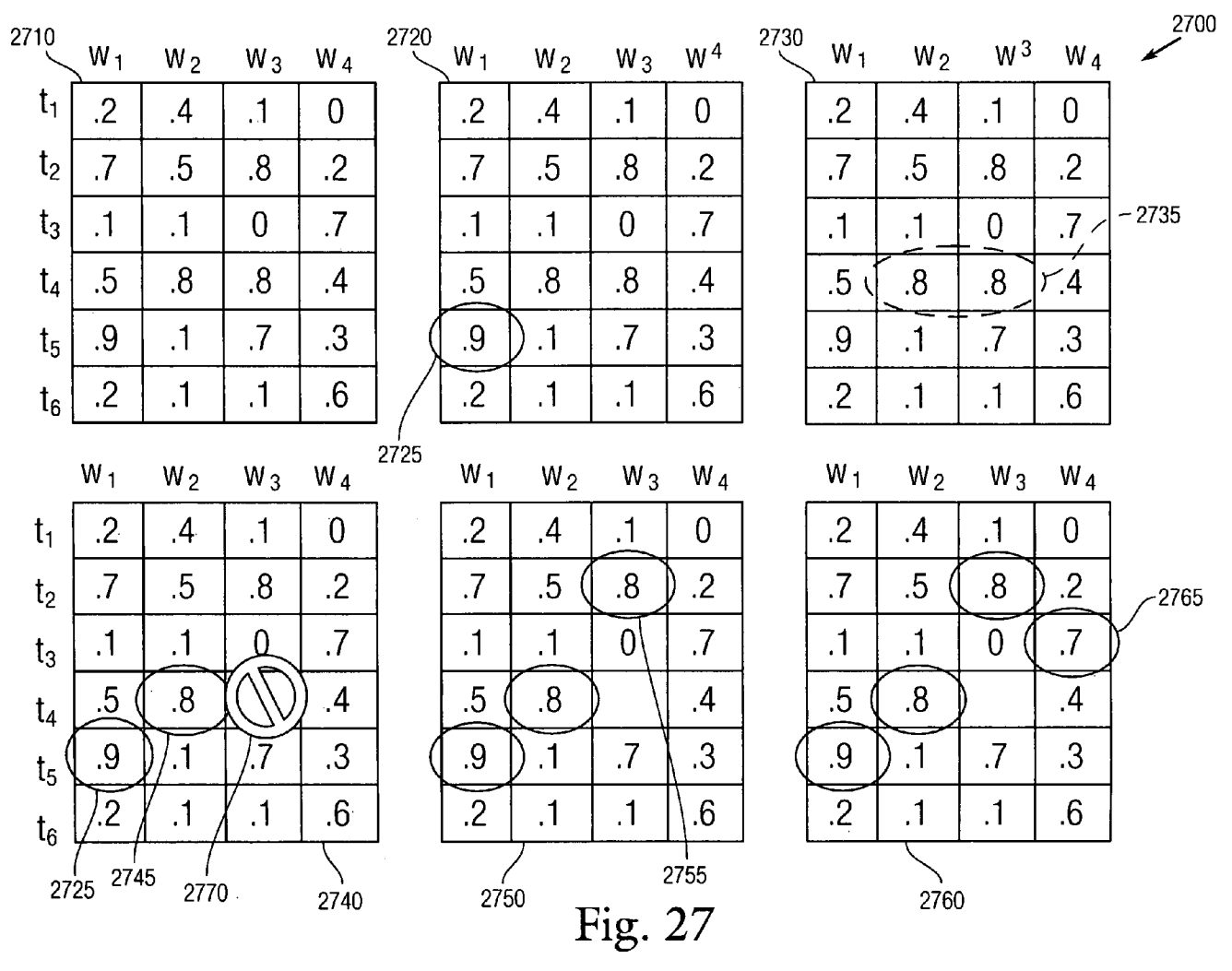

Heap Algorithm Example: FIG. 27 shows a series 2700 of benefit arrays illustrating heap operations for a set of four columns of agents ($w_1, \ldots, w_4$) and six rows of actions ($t_1, \ldots, t_6$). The first array 2710 shows an initial set of benefits, as provided in operation 540. Initially, the maximum benefit among all agents (i.e., the maximum value of heap heads) corresponds to the first agent assignment, as provided in operation 625. The second array 2720 identifies the largest benefit of 0.9 as corresponding to the first agent $w_1$, identified by oval 2725 to indicate assignment to the fifth action $t_5$. As the array 2710 has no larger benefit, the query 640 maintains the initial maximum assignment unchanged.

The third array 2730 identifies a conflict in query 645 of the same benefit value of 0.8 for the same fourth action $t_4$ between two heaps for the second and third agents $w_2$ and $w_3$ shown by dash oval 2735. The deconfliction process 700 considers the next most beneficial assignment. The second agent $w_2$ has a next-highest benefit of 0.5 for the second action $t_2$, while the third agent $w_3$ has a next-highest benefit of 0.8 for the second action $t_2$. In this example, the third agent $w_3$ benefits as much from the next-highest assignment, resulting in the conflicted benefit for the third agent $w_3$. Hence, the fourth array 2740 re-moves the fourth action $t_4$ from the third agent $w_3$, resolving the second assignment in favor of the second agent $w_2$, identified by assigned oval 2745.

By removing the head of the third heap (for the third agent $w_3$) from consideration in the fourth array 2740, the remaining tail values are reordered into a new heap. The new head of this heap includes another benefit of the same value of 0.8 at the second action $t_2$. This is the highest of the remaining unassigned heaps, and the fifth array 2750 assigns the third agent $w_3$ to that value for the second action $t_2$, identified by oval 2755. Finally, the sixth array 2760 assigns the remaining fourth agent $w_4$ to the third action $t_3$ for the benefit value of 0.7, identified by oval 2765. A cancel circle 2770 in the fourth array 2740 denotes the removal of the deconflicted value for the third agent at the fourth action.

Figure 28A:
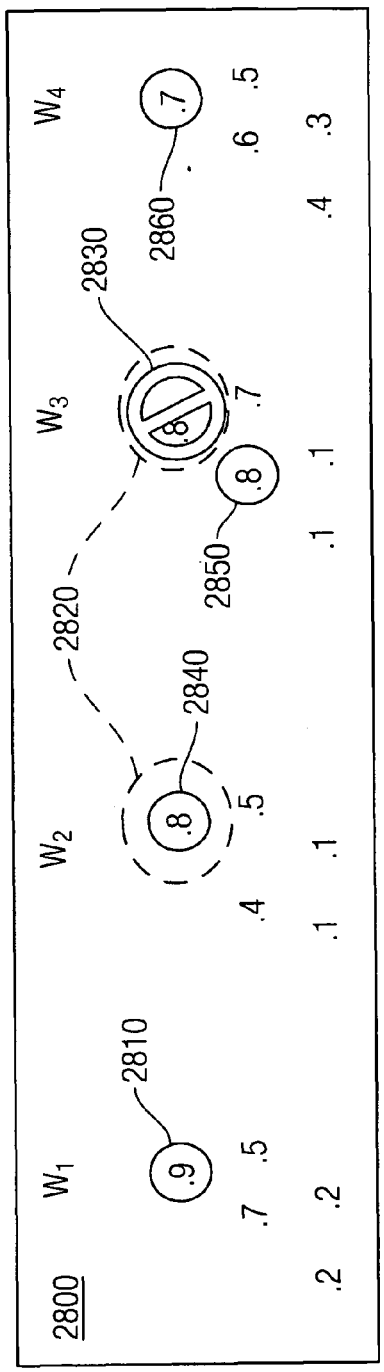
FIG. 28 is a binary tree diagram of the heap algorithm example.

FIG. 28A shows a set of heaps 2800 as a corollary example from its analogous arrays 2700 (with corresponding actions identified therein). The heaps 2800 represent the agents ($w_1, \ldots, w_4$). In the first iteration, the highest benefit among the heads corresponds to the first agent $w_1$ with a benefit of 0.9 at the fifth action $t_5$, and thus becomes the first assignment identified by oval 2810. In the second iteration, query 645 reveals a conflict between the head of the second agent $w_2$ and the initial head of the third agent $w_3$, both with a benefit of 0.8 at the fourth action $t_4$ and identified by dash oval 2820. This initiates the deconfliction process 700 in phase IIa.

Examination of the next-highest benefit shows that the second agent $w_2$ diminishes to a benefit of 0.5 at the second action $t_2$, whereas the third agent $w_3$ experiences maintains a benefit of 0.8 at the second action $t_2$. The process removes the initial head from the third heap shown by cancel circle 2830, and reassigns the highest tail node as replacement. The second assignment sets the head of the second heap identified with oval 2840. The third iteration sets the third assignment as the replacement head of the third heap with oval 2850. In the fourth iteration, the only remaining heap for the fourth agent $w_4$ has a head with benefit of 0.7 at the third action $t_3$ to be set as the fourth assignment identified by oval 2860.

Figure 28B:
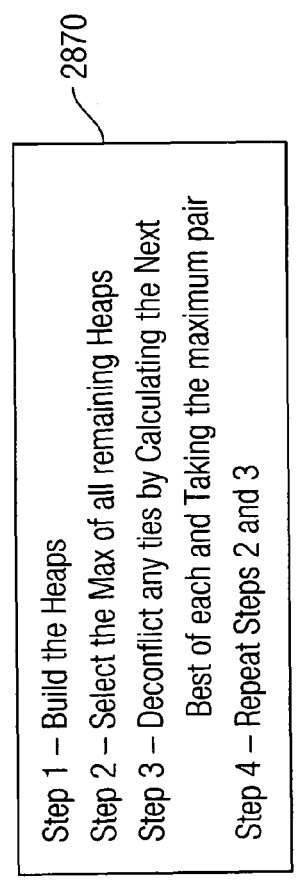

FIG. 28B summarizes the operations in a table 2870 by step-1 of building the heaps, step-2 of selecting the maximum of all remaining heaps, step-3 of deconflicting any ties (by calculating the next best benefit of each the select the maximum pair), and step-4 of repeating the second and third steps.

FIG. 29 illustrates a set 2900 of tables for an example of distinction, where the heap algorithm fails to give the optimal solution. The example compares scenarios for the expected value in probabilistic and heap solutions. A scenario array 2910 provides four rows flanked by a series of six columns. A table 2920 summarizes expected value kill (EVK) values for the probabilistic and heap solutions. A benefit array 2930 assigns benefit values for two columns of agents $w_1$ and $w_2$ against two rows of actions $t_1$ and $t_2$. The benefit values for can be summarized as benefit of assigning agent x to action y as $b_{yx}$, so that $b_{11}$=0.4, $b_{12}$=0.4, $b_{21}$=0.2, and $b_{22}$=0.05 corresponding to kill probabilities for each condition.

In the first array 2910, the rows distinguish arrangements of the agents $w_1$ and $w_2$ among the actions $t_1$ and $t_2$. The columns include first action $t_1$, second action $t_2$, first probability of killing the first target $P_{k1}$, second probability of killing the second target $P_{k2}$, summarized probability of killing any one target $P(1)$ and summarized probability of killing both targets $P(2)$. In the first row, the first action $t_1$ has coupled value $b_{11}$ $b_{12}$. In the second row, the second action $t_2$ has coupled value $b_{21}$ $b_{22}$. In the third row, the actions have values respective values of $b_{11}$ and $b_{22}$. In the fourth row, the actions have values respective values of $b_{12}$ and $b_{21}$. These represent all the possible assignment sets.

The kill probabilities are described as follows: In the first row, the first kill probability $P_{k1}$ corresponds to $1-(1-b_{11})(1-b_{12})$=0.36 due to the product nature of that benefit, whereas the second kill probability corresponds to zero. In the second row, the first kill probability is zero, and the second kill probability $P_{k2}$ corresponds to $1-(1-b_{21})(1-b_{22})$=0.24. In the third row, the first and second kill probabilities are $b_{11}$ and $b_{22}$, respectively. In the fourth row, the first and second kill probabilities are $b_{12}$ and $b_{21}$, respectively.

The summary probability of killing any one target P(1) employs the kill probabilities $P_{k1}$ and $P_{k2}$, as well as their respective opposite probabilities $(1-P_{k1})$ and $(1-P_{k2})$. The first row sums the probability product of $P_{k1} \cdot (1-P_{k2})$ plus $(1-P_{k1}) \cdot P_{k2}$ as $(0.64)(1)+(0.36)(0)=0.64$. The second row sums the probability product as $(0.24)(1)+(0.76)(0)=0.24$. The third row sums the probability product as $(0.4)(0.95)+(0.6)(0.05)=0.41$. The fourth row sums the probability product as $(0.4)(0.8)+(0.6)(0.2)=0.44$.

The summary probability of killing both targets P(2) multiplies the first and second kill probabilities together. Thus, for the first two rows, the summary probability of killing both targets is zero. For the third row, the kill probability product is $b_{11} b_{22}=(0.4)(0.05)=0.02$. For the fourth row, the kill probability product is $b_{12} b_{21}=(0.4)(0.2)=0.08$.

The EVK list in the table 2920 provides weighted values corresponding to number of targets killed times the summarized probabilities of that number of kills as $1 \cdot P(1) + 2 \cdot P(2)$. The first row features $0.64+0=0.64$. The second row features $0.24+0=0.24$. The third row features $0.41+2(0.02)=0.45$. The fourth row features $0.44+2(0.08)=0.60$. The first and fourth rows correlate closely in benefit value. The first row, as the maximum expected kill value, corresponds to the probabilistic solution. The fourth row corresponds to the heap solution, and represents 93.8% of the optimal.

Figure 30:
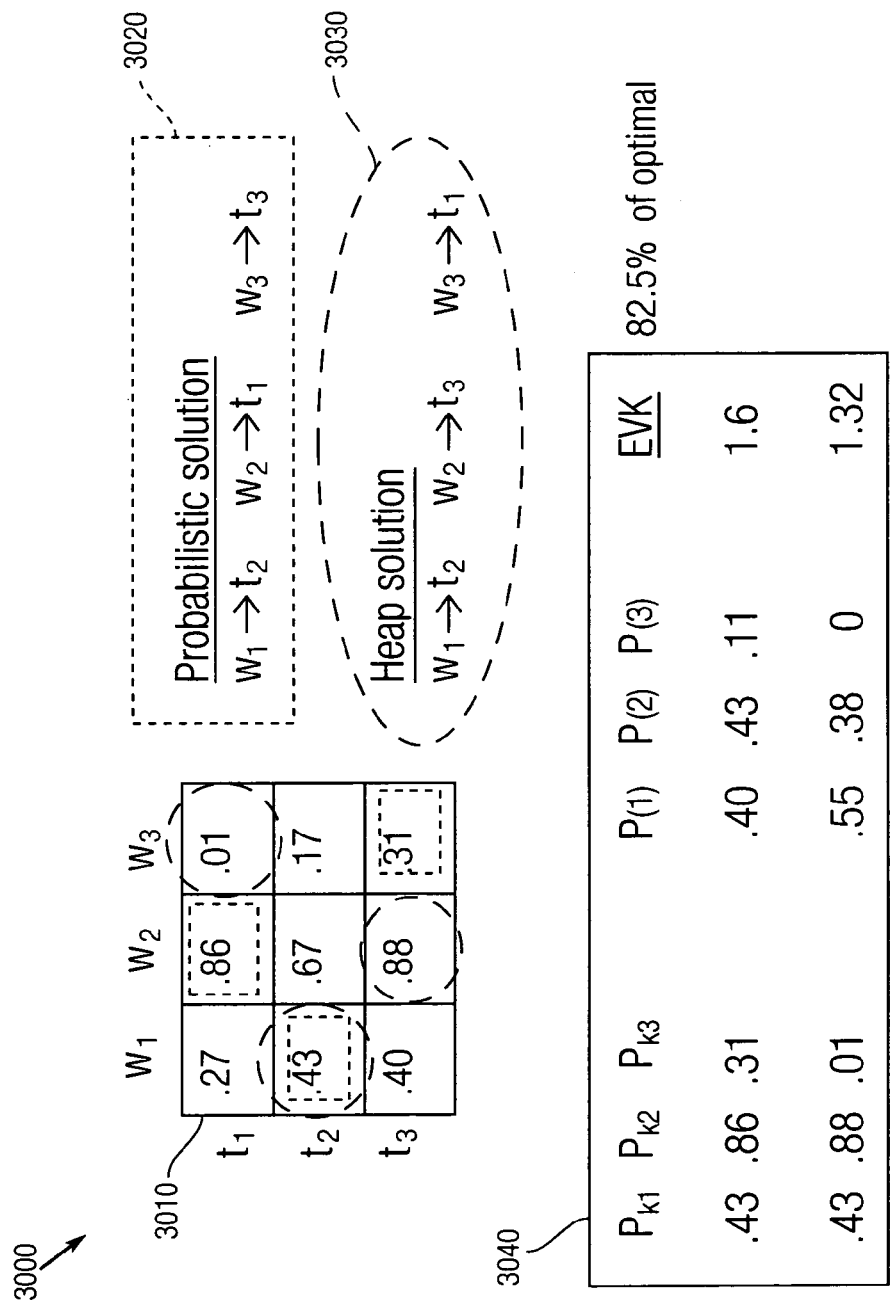
FIG. 30 is a tabular view of a second distinction example.

FIG. 30 provides a set of tables 3000 for a further simplified (albeit somewhat unrealistic) example. An array 3010 listing three agents in columns against three actions in rows includes an assigned benefit for each assignment element in the array. The probabilistic solution, denoted by dotted rectangles 3020, assigns the first agent to the second target, the second agent to the third target and the third agent to the first target. The heap solution, denoted by dash ovals 3030, assigns the first agent to the second action, the second agent to the first action and the third agent to the third action.

A comparison table 3040 lists the kill and summary probabilities (as described for the table 2910) identifying the parameters in the first row. The probabilistic values are presented in the second row. The heap values are presented in the third row. The probabilistic EVK is 1.6 as optimal, in comparison to the heap EVK as 1.32 that corresponds to 82.5% of the optimal. However, the example values are contrived to favor the probabilistic solution. Thus, in a more typical problem, the heap solution should correspond more closely to the probabilistic, with the advantage of improved computation speed.

Thus, the heap algorithm provides an expeditious solution for optimization problems. The solutions described by these exemplary methods provide acceptable correlation to probabilistic methods, while enabling results within practical time limits.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method for optimizing a decision assignment based on a sought benefit, said method comprising:

mapping a plurality of agents to a plurality of actions into a plurality of agent-action pairs;

designating a benefit to each pair of said plurality of pairs to generate a corresponding plurality of benefits in a set of nodes;

arranging said set of nodes into a plurality of heaps corresponding to said plurality of agents, such that for each heap in said plurality of heaps, a node having the sought benefit is disposed as a head of said each heap to establish a plurality of heads corresponding to said plurality of heaps, with a tail of said each heap containing any remaining node in said each heap;

assigning a first head among said plurality of heads as an initial head, said initial head corresponding to an initial action and an initial benefit;

comparing a second head among said plurality of heads to said initial head, such that said second head corresponds to a second benefit;

removing, from said each heap, each tail node that includes a tail action corresponding to said initial action; and repeating said comparing and removing operations for any remaining heap of said plurality of heaps;

summing each benefit for said plurality of heads to determine a cumulative benefit.

2. The method according to claim 1, wherein comparing said second heap further comprises:

assigning said second head as said initial head in response to said second benefit corresponding to the sought benefit;

comparing a third benefit of a first tail node in said first heap to a fourth benefit of a second tail node in said second heap as corresponding to the sought benefit in response to said second benefit equaling said initial benefit;

replacing said first tail node as said first head and assigning said second head as said initial head in response to said third benefit corresponding to the sought benefit; and replacing said second tail node as said second head in response to said fourth benefit corresponding to the sought benefit.

3. The method according to claim 1, wherein designating said benefit further comprises:

associating said node with said benefit and said action that correspond to said pair.

4. The method according to claim 3, wherein arranging said set further comprises:

sorting each said node according to said agent that corresponds to said pair; and disposing said node for said set of nodes into said heap that corresponds to said agent for building said heap.

5. The method according to claim 4, wherein within said each heap, arranging said set further comprises:

comparing first and second nodes to determine which node thereof has the sought benefit within said heap; and ordering said which node as said head of said heap.

6. The method according to claim 5, wherein within said each heap, arranging said set further comprises:

selecting third and fourth nodes within said tail;

comparing said third and fourth nodes to determine which node thereof has the sought benefit within said tail; and ordering said which node as said head of said tail.

7. The method according to claim 1, wherein the sought benefit corresponds to one of a maximum gain, a minimum gain, and a break-even gain.

8. The method according to claim 1, wherein repeating said comparing and removing operations concludes upon each heap being assigned.

9. A computer-readable medium that provides instructions for optimizing a decision assignment based on a benefit, said instructions comprising:

mapping a plurality of agents to a plurality of actions into a plurality of agent-action pairs;

designating a benefit to each pair of said plurality of pairs to generate a corresponding plurality of benefits in a set of nodes;

arranging said set of nodes into a plurality of heaps corresponding to said plurality of agents, such that for each heap in said plurality of heaps, a node having the sought benefit is disposed as a head of said each heap to establish a plurality of heads corresponding to said plurality of heaps, with a tail of said each heap containing any remaining node in said each heap;

assigning a first head among said plurality of heads as an initial head, said initial head corresponding to an initial action and an initial benefit;

comparing a second head among said plurality of heads to said initial head, such that said second head corresponds to a second benefit;

removing, from said each heap, each tail node that includes a tail action corresponding to said initial action; and repeating said comparing and removing operations for any remaining heap of said plurality of heaps;

summing each benefit for said plurality of heads to determine a cumulative benefit.

10. The medium according to claim 9, wherein comparing said second heap further comprises:

assigning said second head as said initial head in response to said second benefit corresponding to the sought benefit;

comparing a third benefit of a first tail node in said first heap to a fourth benefit of a second tail node in said second heap as corresponding to the sought benefit in response to said second benefit equaling said initial benefit;

replacing said first tail node as said first head and assigning said second head as said initial head in response to said third benefit corresponding to the sought benefit; and replacing said second tail node as said second head in response to said fourth benefit corresponding to the sought benefit.

11. The medium according to claim 9, wherein designating said benefit further comprises:

associating said node with said benefit and said action that correspond to said pair.

12. The medium according to claim 11, wherein arranging said set further comprises:

sorting each said node according to said agent that corresponds to said pair; and disposing said node for said set of nodes into said heap that corresponds to said agent for building said heap.

13. The medium according to claim 12, wherein within said each heap, arranging said set further comprises:

comparing first and second nodes to determine which node thereof has the sought benefit within said heap; and ordering said which node as said head of said heap.

14. The medium according to claim 13, wherein within said each heap, arranging said set further comprises:

selecting third and fourth nodes within said tail;

comparing said third and fourth nodes to determine which node thereof has the sought benefit within said tail; and ordering said which node as said head of said tail.

15. The medium according to claim 9, wherein the sought benefit corresponds to one of a maximum gain, a minimum gain, and a break-even gain.

16. The medium according to claim 9, wherein repeating said comparing and removing operations concludes upon each heap being assigned.

* * * * *